（12) United States Patent
Maruhashi et al.

(10) Patent No.: US 12,548,800 B2
(45) Date of Patent: Feb. 10, 2026

(54) SECONDARY BATTERY AND METHOD OF PRODUCING SAME

(71) Applicant: ZEON CORPORATION, Tokyo (JP)

(72) Inventors: Yutaka Maruhashi, Tokyo (JP); Masanobu Sato, Tokyo (JP)

(73) Assignee: ZEON CORPORATION, Tokyo (JP)

(*) Notice: Subject to any disclaimer, the term of this patent is extended or adjusted under 35 U.S.C. 154(b) by 722 days.

(21) Appl. No.: 17/757,099

(22) PCT Filed: Dec. 15, 2020

(86) PCT No.: PCT/JP2020/046808
§ 371 (c)(1),
(2) Date: Jun. 9, 2022

(87) PCT Pub. No.: WO2021/131918
PCT Pub. Date: Jul. 1, 2021

(65) Prior Publication Data
US 2023/0006263 A1 Jan. 5, 2023

(30) Foreign Application Priority Data
Dec. 27, 2019 (JP) ................................. 2019-239665

(51) Int. Cl.
H01M 10/0587 (2010.01)
H01M 10/0525 (2010.01)
(Continued)

(52) U.S. Cl.
CPC ... *H01M 10/0587* (2013.01); *H01M 10/0525* (2013.01); *H01M 10/0585* (2013.01);
(Continued)

(58) Field of Classification Search
CPC .......... H01M 10/0587; H01M 50/121; H01M 10/0525; H01M 10/0585
(Continued)

(56) References Cited

U.S. PATENT DOCUMENTS

2012/0196167 A1* 8/2012 Kim ............... H01M 10/052
29/623.1
2012/0196172 A1* 8/2012 Maeda ............ H01M 10/4235
29/623.5
(Continued)

FOREIGN PATENT DOCUMENTS

CN 102576912 A 7/2012
CN 102623740 A 8/2012
(Continued)

OTHER PUBLICATIONS

Jun. 28, 2022, International Preliminary Report on Patentability issued in the International Patent Application No. PCT/JP2020/046808.
(Continued)

*Primary Examiner* — Niki Bakhtiari
*Assistant Examiner* — Ryan K. Blackwell-Rudasill
(74) *Attorney, Agent, or Firm* — KENJA IP LAW PC

(57) ABSTRACT

A secondary battery includes a laminate in which a positive electrode, a separator, and a negative electrode are stacked in stated order. When either or both of an affixing surface X of the positive electrode and the separator and an affixing surface Y of the negative electrode and the separator are defined as a surface Z and the length of a connecting side of a positive electrode tab connected to the positive electrode or a negative electrode tab connected to the negative electrode is defined as L, resistance A per unit area of a region P, at the surface Z, that has a rectangular shape having the connecting side and a line segment a distance 0.3L from the connecting side as one pair of opposite sides is larger than resistance B per unit area of a region Q other than the region P at the surface Z.

9 Claims, 12 Drawing Sheets

(51) Int. Cl.
  *H01M 10/0585* (2010.01)
  *H01M 10/42* (2006.01)
  *H01M 50/121* (2021.01)
  *H01M 50/449* (2021.01)
  *H01M 50/46* (2021.01)

(52) U.S. Cl.
  CPC ...... *H01M 50/121* (2021.01); *H01M 10/4235* (2013.01); *H01M 50/449* (2021.01); *H01M 50/46* (2021.01)

(58) Field of Classification Search
  USPC ........................................................ 429/163
  See application file for complete search history.

(56) References Cited

U.S. PATENT DOCUMENTS

| | | | |
|---|---|---|---|
| 2017/0117521 | A1 | 4/2017 | Sasaki |
| 2018/0145376 | A1 | 5/2018 | Jo et al. |
| 2020/0335827 | A1* | 10/2020 | Sugimoto ............... B32B 37/12 |

FOREIGN PATENT DOCUMENTS

| | | | | |
|---|---|---|---|---|
| CN | 106463697 A | | 2/2017 | |
| EP | 3605654 A1 | | 2/2020 | |
| JP | 2013507732 A | | 3/2013 | |
| JP | 2017027945 A | | 2/2017 | |
| KR | 1020180058370 A | | 6/2018 | |
| KR | 1020190128060 A | | 11/2019 | |
| WO | 2015198530 A1 | | 12/2015 | |
| WO | WO-2019131348 A1 * | | 7/2019 | .......... H01M 50/403 |

OTHER PUBLICATIONS

Nov. 11, 2024, the Extended European Search Report issued by the European Patent Office in the corresponding European Patent Application No. 20906089.6.

Feb. 16, 2021, International Search Report issued in the International Patent Application No. PCT/JP2020/046808.

* cited by examiner

SECONDARY BATTERY AND METHOD OF PRODUCING SAME

TECHNICAL FIELD

The present disclosure relates to a secondary battery and a method of producing the same.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as a positive electrode, a negative electrode, and a separator that isolates the positive electrode and the negative electrode from each other and prevents short circuiting between the positive and negative electrodes.

Known secondary battery structures include a stacked structure in which a positive electrode, a separator, and a negative electrode are stacked alternately and a wound structure in which an elongated positive electrode, separator, and negative electrode are overlapped and then wound up concentrically. In particular, stacked secondary batteries have been attracting interest in recent years from a viewpoint of having excellent energy density, safety, quality, and durability.

In production of a secondary battery, a battery member having adhesive material at a surface thereof may be produced, and this battery member may then be affixed to another battery member, for example. Moreover, a battery member having adhesive material at a surface thereof can be produced by applying, onto the battery member surface, a composition for adhesion (slurry for a secondary battery) containing a polymer (binder) displaying adhesiveness and so forth that are dispersed and/or dissolved in a solvent, and then drying the composition for adhesion (for example, refer to Patent Literature (PTL) 1).

CITATION LIST

Patent Literature

PTL 1: JP2017-27945A

SUMMARY

Technical Problem

Metal such as lithium may be deposited at the surface of an electrode during charging of a secondary battery. Particularly in the case of large batteries that are for in-vehicle use or like, when the secondary battery includes electrode tabs such as a positive electrode tab connected to a positive electrode and a negative electrode tab connected to a negative electrode, deposition of metal such as lithium has a high tendency to occur around a location where an electrode tab is connected at an electrode surface due to concentration of current at that location. Since reduction of capacity and short circuiting between electrodes may occur when metal is deposited at the surface of an electrode in a secondary battery, it is desirable to inhibit such metal deposition at electrode surfaces.

However, there is room for improvement of a conventional secondary battery such as described above in terms of inhibiting metal deposition at an electrode surface during charging.

Accordingly, an object of the present disclosure is to provide a secondary battery in which metal deposition at an electrode surface during charging is inhibited.

Solution to Problem

The inventors conducted diligent investigation to achieve the object set forth above. The inventors discovered that it is possible to inhibit metal deposition at an electrode surface during charging of a secondary battery by, at a surface Z that is either or both of an affixing surface X of a positive electrode and a separator and an affixing surface Y of a negative electrode and a separator, setting the resistance A per unit area of a region P that has a rectangular shape having a connecting side of a positive electrode tab or a negative electrode tab and a line segment a specific distance from the connecting side as one pair of opposite sides as larger than the resistance B per unit area of a region Q other than the region P. In this manner, the inventors completed the present disclosure.

Specifically, the present disclosure aims to advantageously solve the problem set forth above, and a presently disclosed secondary battery comprises a laminate in which a positive electrode, a separator, and a negative electrode are stacked in stated order, wherein, when either or both of an affixing surface X of the positive electrode and the separator and an affixing surface Y of the negative electrode and the separator are defined as a surface Z, and length of a connecting side of a positive electrode tab connected to the positive electrode or a negative electrode tab connected to the negative electrode is defined as L, resistance A per unit area of a region P, at the surface Z, that has a rectangular shape having the connecting side and a line segment a distance 0.3L from the connecting side as one pair of opposite sides is larger than resistance B per unit area of a region Q other than the region P at the surface Z. By setting the resistance A per unit area of the region P, at the surface Z, that has a rectangular shape having a connecting side of the positive electrode tab or the negative electrode tab and a line segment the specific distance set forth above from the connecting side as one pair of opposite sides (hereinafter, also referred to as the "electrode tab-bordering region P") as larger than the resistance B per unit area of the region Q other than the region P at the surface Z (hereinafter, also referred to as the "other region Q") in this manner, it is possible to inhibit metal deposition at an electrode surface during charging of the secondary battery.

Note that the resistance A per unit area of the specific electrode tab-bordering region P set forth above and the resistance B per unit area of the other region Q can be measured by a method described in the EXAMPLES section of the present specification.

In the presently disclosed secondary battery, it is preferable that an adhesive material is present at the surface Z, and a ratio of coverage E of the adhesive material in the region P of the surface Z is larger than a ratio of coverage F of the adhesive material in the region Q. When the ratio of coverage E of the adhesive material in the electrode tab-bordering region P is larger than the ratio of coverage F of the adhesive material in the other region Q, it is possible to further inhibit metal deposition at an electrode surface during charging of the secondary battery.

In the presently disclosed secondary battery, the ratio of coverage E is preferably not less than 1.3% and not more than 30%. When the ratio of coverage E of the adhesive material in the electrode tab-bordering region P of the surface Z is within the specific range set forth above, it is possible to further inhibit metal deposition at an electrode surface during charging of the secondary battery. Moreover, when the ratio of coverage E of the adhesive material in the electrode tab-bordering region P of the surface Z is within the specific range set forth above, adhesive strength of an electrode and a separator can be sufficiently ensured while also causing the secondary battery to sufficiently display excellent output characteristics.

In the presently disclosed secondary battery, the ratio of coverage F is preferably not less than 0.5% and less than 0.4×E %. When the ratio of coverage F of the adhesive material in the other region Q of the surface Z is within the specific range set forth above, adhesive strength of an electrode and a separator can be sufficiently ensured while also causing the secondary battery to sufficiently display excellent output characteristics.

In the presently disclosed secondary battery, it is preferable that an adhesive material is present at the surface Z, that the adhesive material contains a particulate polymer, and that the particulate polymer has a core-shell structure including a core portion and a shell portion partially covering an outer surface of the core portion. When a particulate polymer having a core-shell structure that includes a core portion and a shell portion partially covering an outer surface of the core portion is used as the adhesive material, adhesive strength of an electrode and a separator can be sufficiently ensured while also causing the secondary battery to sufficiently display excellent output characteristics.

Moreover, the present disclosure aims to advantageously solve the problem set forth above, and a presently disclosed method of producing a secondary battery is a method of producing a secondary battery including a laminate in which a positive electrode, a separator, and a negative electrode are stacked in stated order, comprising a step of applying an adhesive material at a surface Z that is either or both of an affixing surface X of the positive electrode and the separator and an affixing surface Y of the negative electrode and the separator, wherein, when length of a connecting side of a positive electrode tab connected to the positive electrode or a negative electrode tab connected to the negative electrode is defined as L, a ratio of coverage E of the adhesive material in a region P, at the surface Z, that has a rectangular shape having the connecting side and a line segment a distance 0.3L from the connecting side as one pair of opposite sides is larger than a ratio of coverage F of the adhesive material in a region Q other than the region P at the surface Z. Through the presently disclosed method of producing a secondary battery set forth above, it is possible to obtain a secondary battery in which metal deposition at an electrode surface during charging is inhibited.

In the presently disclosed method of producing a secondary battery, the ratio of coverage E is preferably not less than 1.3% and not more than 30%. When the ratio of coverage E of the adhesive material in the electrode tab-bordering region P of the surface Z is within the specific range set forth above, it is possible to further inhibit metal deposition at an electrode surface during charging of the produced secondary battery. Moreover, when the ratio of coverage E of the adhesive material in the electrode tab-bordering region P of the surface Z is within the specific range set forth above, adhesive strength of an electrode and a separator can be sufficiently ensured while also causing the produced secondary battery to sufficiently display excellent output characteristics.

In the presently disclosed method of producing a secondary battery, the ratio of coverage F is preferably not less than 0.5% and less than 0.4×E %. When the ratio of coverage F of the adhesive material in the other region Q of the surface Z is within the specific range set forth above, adhesive strength of an electrode and a separator can be sufficiently ensured while also causing the produced secondary battery to sufficiently display excellent output characteristics.

In the presently disclosed method of producing a secondary battery, the adhesive material contains a particulate polymer, and the particulate polymer has a core-shell structure including a core portion and a shell portion partially covering an outer surface of the core portion. When a particulate polymer having a core-shell structure that includes a core portion and a shell portion partially covering an outer surface of the core portion is used as the adhesive material, adhesive strength of an electrode and a separator can be sufficiently ensured while also causing the produced secondary battery to sufficiently display excellent output characteristics.

Advantageous Effect

According to the present disclosure, it is possible to provide a secondary battery in which metal deposition at an electrode surface during charging is inhibited.

DETAILED DESCRIPTION

Figure 1A:
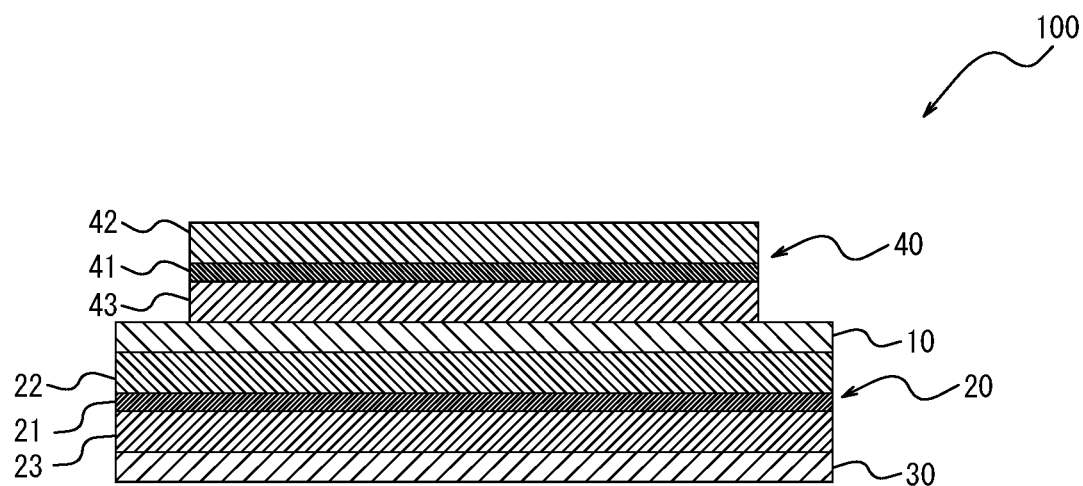
FIG. 1A is a front view illustrating the structure of one example of a laminate in a presently disclosed secondary battery.

The following describes the presently disclosed secondary battery and method of producing a secondary battery with reference to the drawings. Note that the dimensions of some members in the drawings are enlarged or reduced in order to facilitate understanding.

(Secondary Battery)

The presently disclosed secondary battery includes at least a specific laminate and may include an electrolyte solution and other members as necessary. Moreover, the presently disclosed secondary battery can be produced using the presently disclosed method of producing a secondary battery, for example.

<Laminate>

The laminate in the presently disclosed secondary battery is a laminate in which a positive electrode, a separator, and a negative electrode are stacked in stated order.

Figure 1B:
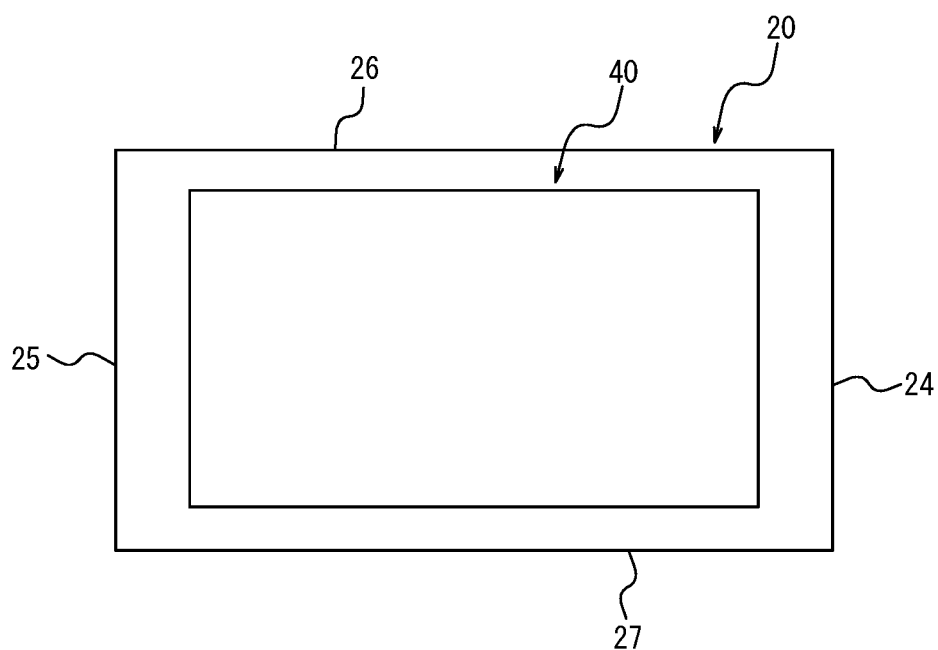
FIG. 1B is a plan view for describing a positional relationship of a negative electrode and a positive electrode in the laminate illustrated in FIG. 1A.
Figure 2:
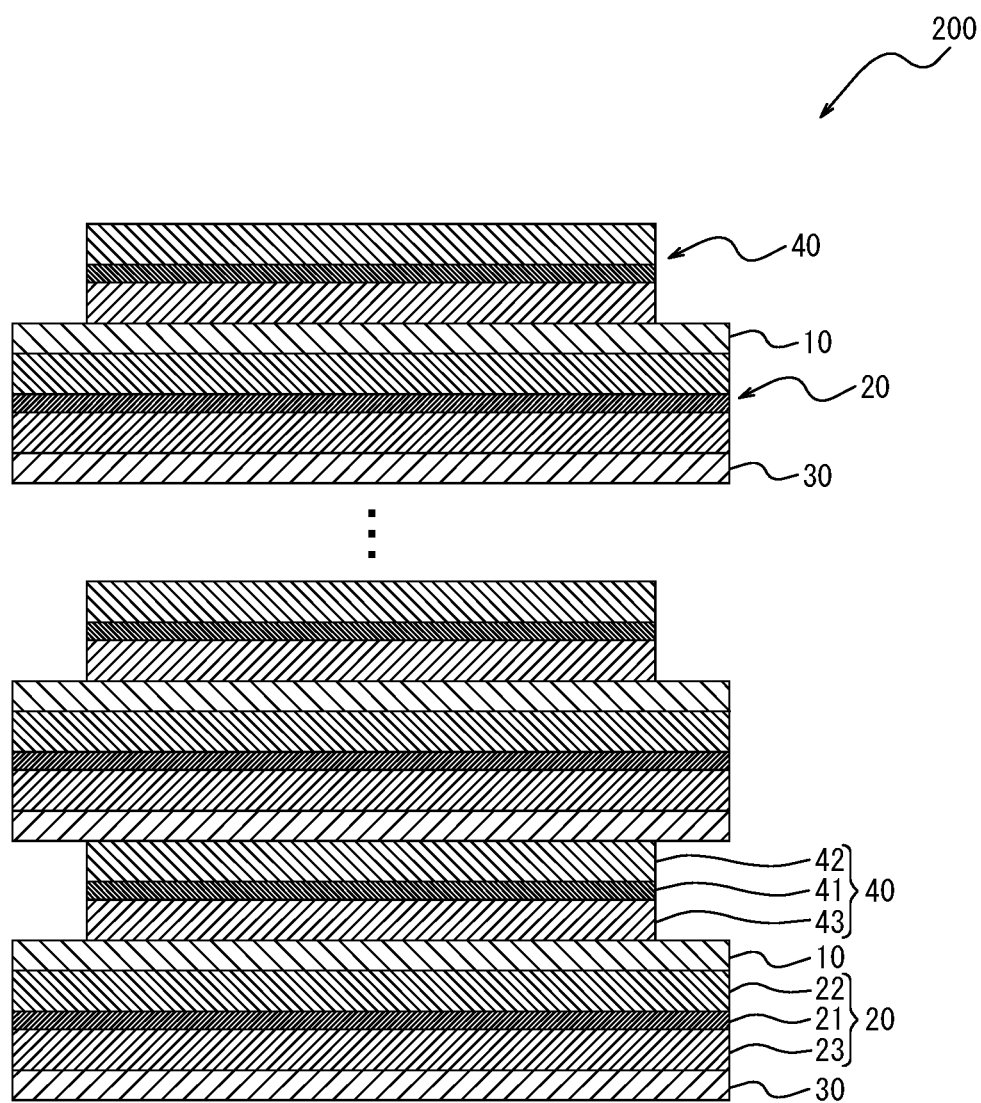
FIG. 2 is a front view illustrating the structure of one example of a stack obtained through stacking of laminates in a presently disclosed secondary battery.
Figure 3:
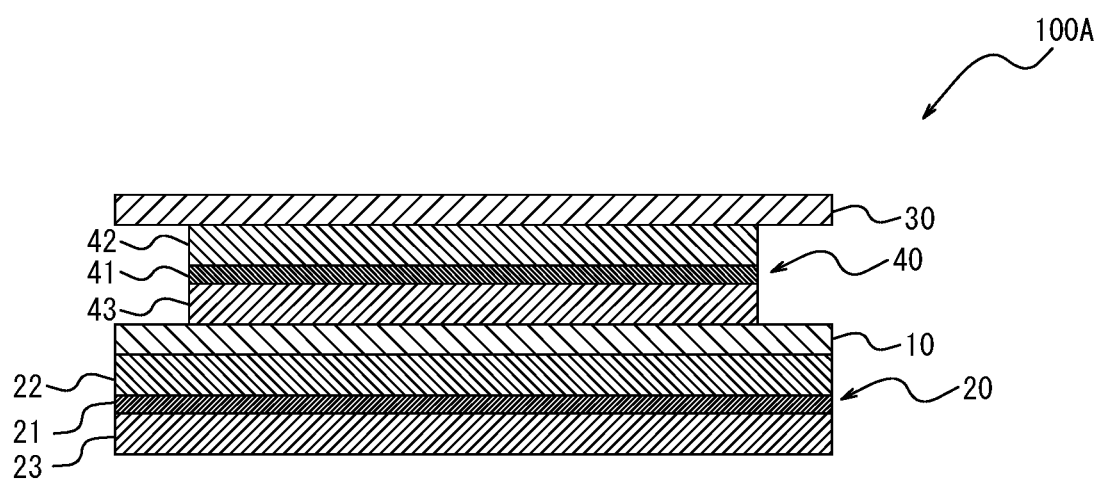
FIG. 3 is a front view illustrating the structure of another example of a laminate in a presently disclosed secondary battery.

Note that the laminate in the presently disclosed secondary battery may have a structure such as illustrated in FIGS. 1A and 1B or a structure such as illustrated in FIG. 3, for example. Moreover, the laminate may be stacked to obtain a stack 200 as illustrated in FIG. 2, for example, and can then be used in a stacked secondary battery or the like.

As illustrated in FIGS. 1A and 1B or FIG. 3, the laminate 100 or 100A includes a negative electrode 20, a first separator 10 affixed to one surface of the negative electrode, a positive electrode 40 affixed to a surface of the first separator 10 at the opposite side thereof to the negative electrode 20, and a second separator 30 affixed to the other surface of the negative electrode 20 or a surface of the positive electrode 40 at the opposite side thereof to the first separator 10.

Moreover, in the laminate 100 or 100A, the positive electrode 40 has a smaller size in plan view than the negative electrode 20, the first separator 10, and the second separator 30 as illustrated in FIG. 1B. More specifically, in plan view, the negative electrode 20 of the laminate 100 or 100A includes a first edge 24 and a second edge 25 that are in opposition in an orthogonal direction relative to a stacking direction, and the positive electrode 40 is located between the first edge 24 and the second edge 25 when viewed in the stacking direction. Note that the first edge 24 and the second edge 25 are normally edges that correspond to cutting positions where an elongated negative electrode web has been cut to obtain the negative electrode 20.

The laminate 100 illustrated in the front view of FIG. 1A includes a negative electrode 20, a first separator 10 affixed to one surface (upper surface in FIG. 1A) of the negative electrode 20, a positive electrode 40 affixed to a surface of the first separator 10 at the opposite side thereof (upper side in FIG. 1A) to the negative electrode 20, and a second separator 30 affixed to the other surface of the negative electrode 20. In this example, the first separator 10, the negative electrode 20, the second separator 30, and the positive electrode 40 each have a rectangular shape in plan view. The negative electrode 20 has a structure in which negative electrode mixed material layers 22 and 23 containing a negative electrode active material have been formed at both surfaces of a negative electrode current collector 21. The positive electrode 40 has a structure in which positive electrode mixed material layers 42 and 43 containing a positive electrode active material have been formed at both surfaces of a positive electrode current collector 41. The positive electrode 40 has a smaller size in plan view than the negative electrode 20, the first separator 10, and the second separator 30 and, as illustrated by the plan view positional relationship of the negative electrode 20 and the positive electrode 40 in FIG. 1B, the positive electrode 40 is located between a first edge 24 and a second edge 25 of the negative electrode 20 that are in opposition in an orthogonal direction (left/right direction in FIG. 1B) relative to the stacking direction and also between a third edge 26 and a fourth edge 27 of the negative electrode 20 that extend in the left/right direction in FIG. 1B and are orthogonal to the first edge 24 and the second edge 25.

The laminate 100A illustrated in the front view of FIG. 3 has the same configuration as the laminate 100 illustrated in FIGS. 1A and 1B with the exception that the second separator 30 is affixed to a surface of the positive electrode 40 at the opposite side thereof (upper side in FIG. 3) to the first separator 10 instead of being affixed to the other surface of the negative electrode 20.

It should be noted, however, that the laminate in the presently disclosed secondary battery is not limited to the examples illustrated in FIGS. 1A and 1B and FIG. 3. For example, the first separator 10 and the second separator 30 may have a larger size in plan view than the negative electrode 20 in the laminate. By using a laminate in which the first separator 10 and the second separator 30 are larger than the negative electrode 20, safety of the secondary battery can be further increased.

<<Surface Z, Electrode Tabs (Positive Electrode Tab and Negative Electrode Tab), and Electrode Tab-Bordering Region P>>

A surface Z is either or both of an affixing surface Y of a negative electrode and a separator and an affixing surface X of a positive electrode and a separator. Moreover, a positive electrode tab is connected to the positive electrode and a negative electrode tab is connected to the negative electrode. Furthermore, the length of a connecting side of the positive electrode tab connected to the positive electrode or the negative electrode tab connected to the negative electrode is defined as L.

An electrode tab-bordering region P is a region, at the surface Z, that has a rectangular shape having the connecting side of the positive electrode tab or the negative electrode tab and a line segment a distance 0.3L from the connecting side as one pair of opposite sides.

Figure 4:
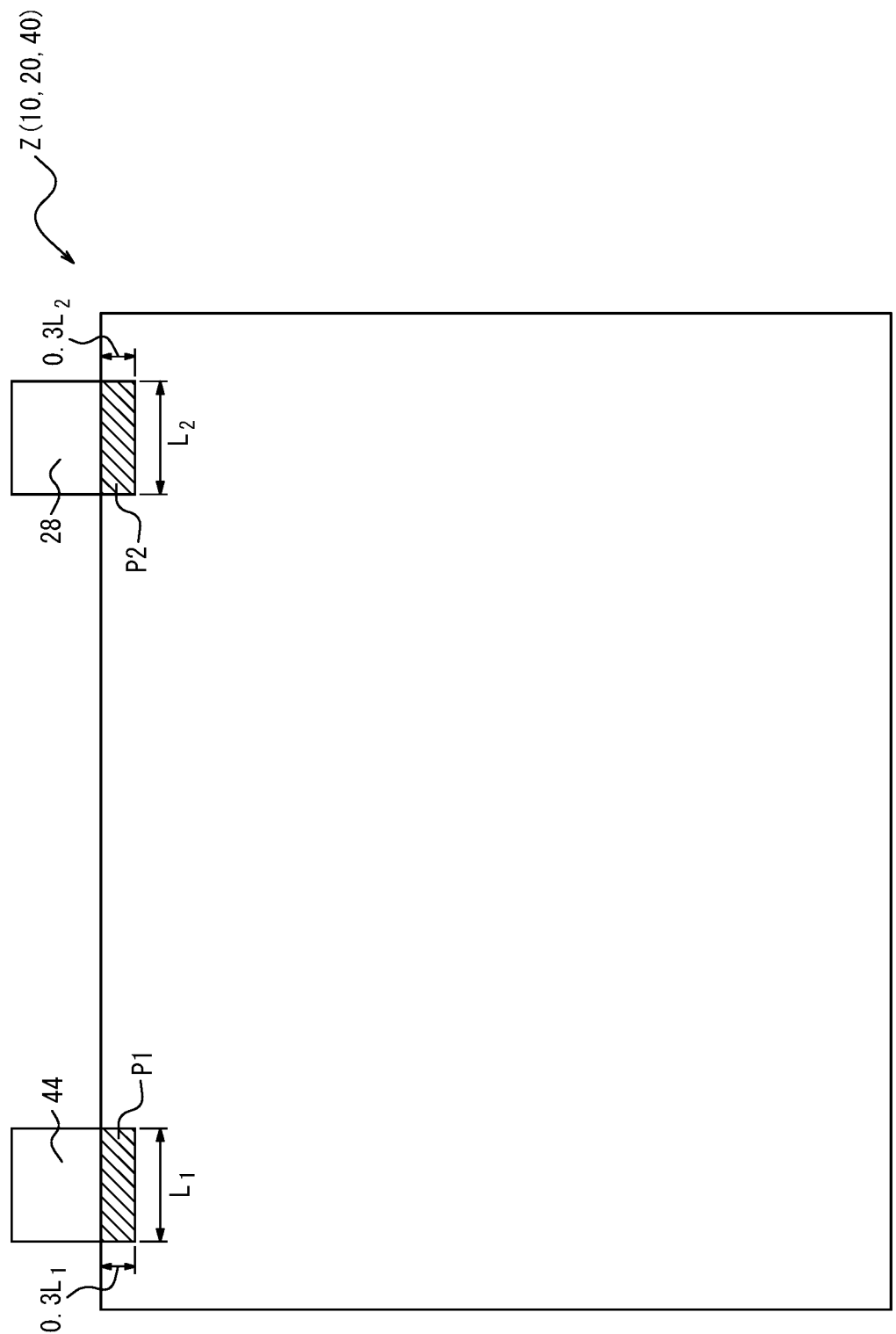
FIG. 4 is an explanatory diagram for describing an electrode tab-bordering region P at a surface Z.

The electrode tab-bordering region P at the surface Z is described more specifically with reference to FIG. 4.

A surface Z illustrated in FIG. 4 is either or both of an affixing surface Y of the negative electrode 20 and the first separator 10 and an affixing surface X of the positive electrode 40 and the first separator 10.

A positive electrode tab 44 is connected to the positive electrode 40, and the length of a connecting side of this positive electrode tab 44 is $L_1$. Moreover, a negative electrode tab 28 is connected to the negative electrode 20, and the length of a connecting side of this negative electrode tab 28 is $L_2$.

The electrode tab-bordering region P described above is: (1) a region P1 (positive electrode tab-bordering region P1) that has a rectangular shape having the connecting side of the positive electrode tab 44 and a line segment a distance $0.3L_1$ from the connecting side of the positive electrode tab 44 as one pair of opposite sides; or (2) a region P2 (negative electrode tab-bordering region P2) that has a rectangular shape having the connecting side of the negative electrode tab 28 and a line segment a distance $0.3L_2$ from the connecting side of the negative electrode tab 28 as one pair of opposite sides.

Note that the electrode tab-bordering region P is a region that corresponds to the periphery or inside of the above-described rectangular shape at the surface Z. Accordingly, supposing a case in which part of the rectangular shape described above is present further outward than the periphery of the surface Z, in this case, the electrode tab-bordering region is only a region that is at the periphery or inside of the rectangular shape and is also at or inward of the periphery of the surface Z.

The proportion constituted by the area of the positive electrode tab-bordering region P1 by itself among the area of the entire surface Z is preferably 2.5% or more, more preferably 2.7% or more, and even more preferably 3% or more, and is preferably 10% or less. When the proportion constituted by the area of the positive electrode tab-bordering region P1 by itself among the area of the entire surface Z is not less than any of the lower limits set forth above, it is possible to further inhibit metal deposition at an electrode surface during charging of the secondary battery. On the other hand, when the proportion constituted by the area of the positive electrode tab-bordering region P1 by itself among the area of the entire surface Z is not more than the upper limit set forth above, output characteristics of the secondary battery can be improved.

The proportion constituted by the area of the negative electrode tab-bordering region P2 by itself among the area of the entire surface Z can be set within any of the same ranges as for the proportion constituted by the area of the positive electrode tab-bordering region P1 by itself among the area of the entire surface Z.

The proportion constituted by the total area of the positive electrode tab-bordering region P1 and the negative electrode tab-bordering region P2 among the area of the entire surface Z is preferably 5% or more, more preferably 5.4% or more, and even more preferably 6% or more, and is preferably 20% or less. When the proportion constituted by the total area of the positive electrode tab-bordering region P1 and the negative electrode tab-bordering region P2 among the area of the entire surface Z is not less than any of the lower limits set forth above, it is possible to further inhibit metal deposition at an electrode surface during charging of the secondary battery. On the other hand, when the proportion constituted by the total area of the positive electrode tab-bordering region P1 and the negative electrode tab-bordering region P2 among the area of the entire surface Z is not more than the upper limit set forth above, output characteristics of the secondary battery can be improved.

The length of the connecting side of the positive electrode tab 44 and/or the negative electrode tab 28 and the area of the surface Z can be adjusted as appropriate such that the area of the positive electrode tab-bordering region P1 and/or the negative electrode tab-bordering region P2 satisfies the specific conditions set forth above.

An electrode tab that is the positive electrode tab 44 or the negative electrode tab 28 is normally connected to the periphery of an electrode as illustrated in FIG. 4, but is not specifically limited to being connected in this manner.

Moreover, the "connecting side" of an electrode tab connected to an electrode that is referred to in the present specification is taken to be a boundary line between the electrode and the electrode tab that is observed in plan view of the electrode. In other words, in a case in which the electrode tab is connected to the periphery of the electrode, the connecting side of the electrode tab is a line segment that joins both end points of a section of the periphery of the electrode where the electrode tab is connected, and, in a case in which the electrode tab is connected further inward than the periphery of the electrode, the connecting side of the electrode tab is a line segment that joins both end points of a section of the periphery of the electrode where the electrode tab intersects with the periphery.

No specific limitations are placed on the material forming the electrode tab so long as the secondary battery operates normally. For example, the material forming the electrode tab may be a material that forms a current collector of that electrode, such as aluminum forming a current collector of a positive electrode in the case of a positive electrode tab or copper forming a current collector of a negative electrode in the case of a negative electrode tab.

Moreover, no specific limitations are placed on the method by which the electrode tab is formed at the electrode. For example, a material that forms a current collector of the electrode may be caused to protrude from the periphery of the electrode such as to form the electrode tab. More specifically, the electrode tab can be formed by, in production of the electrode, forming an electrode mixed material layer on a current collector such that a region where the electrode mixed material layer is not formed is provided at an end section of the current collector and subsequently performing cutting or the like of this region to a desired shape.

In terms of arrangement of the positive electrode tab 44 and the negative electrode tab 28 in plan view of the surface Z, the positive electrode tab 44 and the negative electrode tab 28 may be disposed at a side corresponding to the same edge of a surface Z that is rectangular as illustrated in FIG. 4, but this is not a limitation, and the positive electrode tab 44 and the negative electrode tab 28 may be disposed at sides corresponding to different edges of the surface Z. For example, the positive electrode tab 44 may be disposed at a side corresponding to one edge and the negative electrode tab 28 may be disposed at a side corresponding to another edge among two opposite edges of a surface Z that is rectangular.

It should be noted that because the positive electrode 40, the negative electrode 20, and the first separator 10 are each of the same size in FIG. 4, the affixing surface X of the negative electrode 20 and the first separator 10 and the affixing surface Y of the positive electrode 40 and the first separator 10 match each other, and thus the connecting side of the positive electrode tab on the periphery of the affixing surface X and the connecting side of the negative electrode tab on the periphery of the affixing surface Y are both positioned on the periphery of one surface Z in plan view. However, the laminate in the presently disclosed secondary battery is not limited to this configuration.

A feature of the presently disclosed secondary battery is that the resistance A per unit area of the above-described electrode tab-bordering region P is larger than the resistance B per unit area of a region Q (other region Q) other than the electrode tab-bordering region P at the surface Z. By setting the resistance A per unit area of the electrode tab-bordering region P as larger than the resistance B of the region Q other than the electrode tab-bordering region P at the surface Z in this manner, metal deposition at an electrode surface during charging of the secondary battery can be inhibited.

Note that the presently disclosed secondary battery should satisfy either or both of: (i) the resistance A1 per unit area of the positive electrode tab-bordering region P1 being larger than the resistance B1 per unit area of another region Q1 that is a region other than the positive electrode tab-bordering region P1 at the surface Z; and (ii) the resistance A2 per unit area of the negative electrode tab-bordering region P2 being larger than the resistance B2 per unit area of another region Q2 that is a region other than the negative electrode tab-bordering region P2 at the surface Z. From a viewpoint of further inhibiting metal deposition at an electrode surface during charging of the secondary battery, the presently disclosed secondary battery preferably satisfies both (i) and (ii) set forth above.

Although it is not clear why metal deposition at an electrode surface during charging of the secondary battery can be inhibited by setting the resistance A per unit area of the electrode tab-bordering region P as larger than the resistance B per unit area of the other region Q, the reason for this is presumed to be as follows.

Firstly, current flows at the surface Z during charging of the secondary battery, and locations of high current density at the surface Z are prone to deposition of metal such as lithium. In the case of a conventional secondary battery in which a value for the resistance A of an electrode tab-bordering region P is equal to or less than a value for the resistance B of the secondary battery, and particularly in the case of a large battery for in-vehicle use or the like, current density is thought to be high and deposition of metal is thought to have a high tendency to occur in the electrode tab-bordering region P because this region is close to an electrode tab that is responsible for input/output of electrical power.

In response to this issue, the presently disclosed secondary battery makes it possible to equalize current density of the overall secondary battery during charging as a result of the resistance A per unit area of the electrode tab-bordering region P being set as larger than the resistance B per unit area of the other region Q. This is thought to enable reduction of deposition of metal such as lithium in the electrode tab-bordering region P. It is presumed that for this reason, metal deposition at an electrode surface can be inhibited during charging of the secondary battery.

A ratio (A/B) of the resistance A per unit area of the electrode tab-bordering region P and the resistance B per unit area of the other region Q is required to be more than 1, is preferably more than 1.005, and more preferably more than 1.01, and is preferably less than 2, and more preferably less than 1.5. Through the ratio (A/B) of the resistance A per unit area of the electrode tab-bordering region P and the resistance B per unit area of the other region Q being more than 1, it is possible to sufficiently inhibit metal deposition at an electrode surface during charging of the secondary battery. On the other hand, when the ratio (A/B) of the resistance A per unit area of the electrode tab-bordering region P and the resistance B per unit area of the other region Q is less than 2, output characteristics of the secondary battery can be improved.

Note that the resistance A per unit area of the electrode tab-bordering region P and the resistance B per unit area of the other region Q can be adjusted through the ratio of coverage of adhesive material in each of these regions, the type of polymer used as the adhesive material, and so forth.

[Adhesive Material]

An adhesive material is normally present at the surface Z (affixing surface X and/or Y). The adhesive material is a material that adheres an electrode (positive electrode or negative electrode) and a separator at the affixing surface X and/or Y. Note that the adhesive material is described in detail further below.

—Application Method of Adhesive Material—

The adhesive material can be supplied to the affixing surface X and/or Y in any state, such as a solid state, a molten state, a dissolved state in a solvent, or a dispersed state in a solvent. In particular, it is preferable that the adhesive material is supplied in a dissolved state in a solvent or a dispersed state in a solvent, and more preferable that the adhesive material is supplied in a dispersed state in a solvent.

In a case in which the adhesive material is supplied to the affixing surface X and/or Y in a dissolved state in a solvent or a dispersed state in a solvent (i.e., in a case in which a composition for adhesion containing the adhesive material and a solvent is supplied to the affixing surface), the solvent of the composition for adhesion can be water, an organic solvent, or a mixture thereof, for example, without any specific limitations. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, propylene glycol, and ethylene glycol monomethyl ether.

Of the examples given above, a solvent that includes either or both of water and an alcohol is preferable as the solvent from a viewpoint of efficiently producing the laminate.

Note that the solvent described above may be at least partially removed by drying or the like in a production step of the laminate.

Application of the adhesive material using a coating machine (51-54 in FIGS. 10 and 11) described further below can be performed by a known application method such as an inkjet, spraying, dispensing, gravure coating, or screen printing method. Of these application methods, it is preferable that the adhesive material is applied using an inkjet method from a viewpoint of enabling simple adjustment of the amount and range of application of the adhesive material.

The adhesive material is applied to only part of the affixing surface X and/or Y. Specifically, the adhesive material is disposed (applied) such as to be arranged in a specific pattern such as a striped pattern, a dotted pattern, or a lattice pattern, for example, at the affixing surface X and/or Y. From a viewpoint of enhancing output characteristics of the secondary battery, it is preferable that the adhesive material is disposed (applied) such as to be arranged in a dotted pattern at the affixing surface X and/or Y.

The diameter of dots of adhesive material arranged in the dotted pattern is preferably 10 μm or more, and more preferably 20 μm or more, and is preferably 100 μm or less, and more preferably 80 μm or less. When the diameter of dots of adhesive material is not less than any of the lower limits set forth above, adhesive strength of an electrode and a separator can be increased. On the other hand, when the diameter of dots of adhesive material is not more than any of the upper limits set forth above, deterioration of output characteristics of the secondary battery can be inhibited.

The following describes a case in which adhesive material is applied at the surface Z such that two regions are present: "region S where adhesive material is applied densely" and "region T where adhesive material is applied sparsely".

The ratio of coverage of adhesive material in the "region S where adhesive material is applied densely" is set as larger than the ratio of coverage of adhesive material in the "region T where adhesive material is applied sparsely".

Note that in the present specification, the "ratio of coverage of adhesive material" at a given surface or region refers to the proportion constituted by the area of a section that is covered by the adhesive material among the area of the entirety of the given surface or region (i.e., (area of section covered by adhesive material/area of entire surface or region)×100(%)).

Also note that in the present specification, in a case in which a composition for adhesion containing an adhesive material and a solvent is supplied to an affixing surface, "adhesive material" in "ratio of coverage of adhesive material" refers to material in a state in which the solvent has been removed from the composition for an adhesive layer by drying or the like.

The shape of the "region S where adhesive material is applied densely" is not specifically limited and can be set as appropriate to the extent that the desired effects are obtained. In other words, the "region S where adhesive material is applied densely" can have any shape so long as the resistance A of the electrode tab-bordering region P described above is larger than the resistance B of the secondary battery. Moreover, a plurality of regions at positions separated from one another at the surface Z may together constitute one "region S where adhesive material is applied densely".

Note that the "region T where adhesive material is applied sparsely" is all regions of the surface Z other than the "region S where adhesive material is applied densely".

From a viewpoint of further inhibiting metal deposition at an electrode surface during charging of the secondary battery, the shape of the "region S where adhesive material is applied densely" is preferably set such that the ratio of coverage E of adhesive material in the electrode tab-bordering region P described above is larger than the ratio of coverage F of adhesive material in the other region Q.

The region S where adhesive material is applied densely preferably includes at least part of the electrode tab-bordering region P (positive electrode tab-bordering region P1 and/or negative electrode tab-bordering region P2) described above, and more preferably includes all of the electrode tab-bordering region P (positive electrode tab-bordering region P1 and/or negative electrode tab-bordering region P2).

Figure 5:
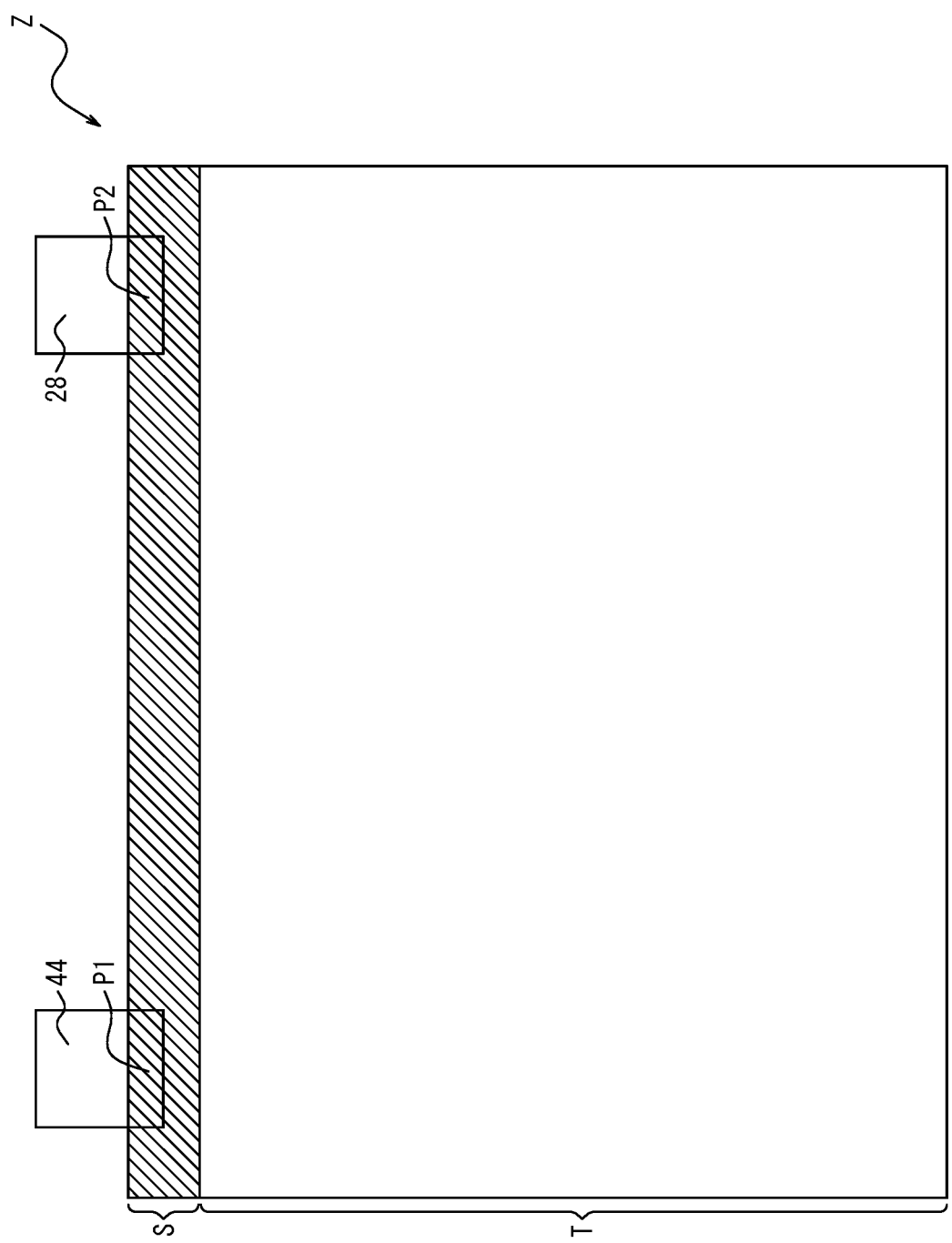
FIG. 5 is an explanatory diagram illustrating one example of a method of applying adhesive material to a surface Z.

For example, in a case in which the positive electrode tab 44 and the negative electrode tab 28 are disposed at a side corresponding to the same edge of a surface Z that is rectangular, the region S where adhesive material is applied densely can be set as a region between the edge at the side where the positive electrode tab 44 and the negative electrode tab 28 are disposed and a straight line parallel to that edge as illustrated in FIG. 5. In FIG. 5, the region S where adhesive material is applied densely includes all of the positive electrode tab-bordering region P1 and all of the negative electrode tab-bordering region P2 described above.

Figure 6:
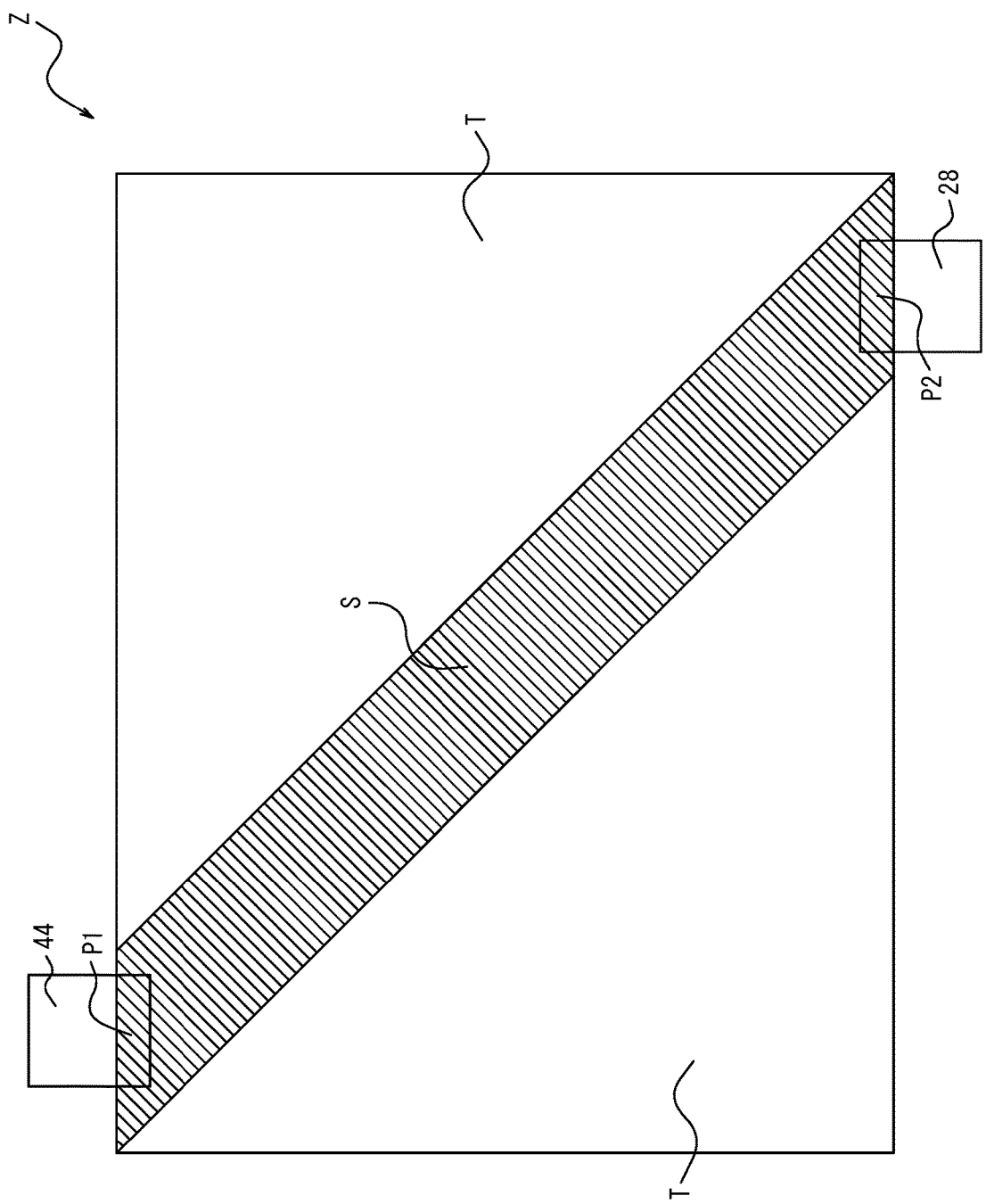
FIG. 6 is an explanatory diagram illustrating another example of a method of applying adhesive material to a surface Z.

Moreover, in a case in which the positive electrode tab 44 is disposed at a side corresponding to one edge and the negative electrode tab 28 is disposed at a side corresponding to another edge among two opposite edges of a surface Z that is rectangular, for example, the region S where adhesive material is applied densely can be set as a region having a belt shape connecting the connecting side of the positive electrode tab 44 and the connecting side of the negative electrode tab 28 as illustrated in FIG. 6. In FIG. 6, the region S where adhesive material is applied densely includes all of the positive electrode tab-bordering region P1 and all of the negative electrode tab-bordering region P2 described above.

It should be noted that although the above description relating to FIGS. 5 and 6 is for a case in which adhesive material is applied at the surface Z in a state in which the positive electrode tab and the negative electrode tab are present (i.e., a state in which the electrode tabs are connected to the respective electrodes), the laminate in the presently disclosed secondary battery is not limited to being produced in this manner, and application of adhesive material at the surface Z may be performed in a state in which the electrode tabs are not connected to the respective electrodes. Even in a case in which adhesive material is applied at the surface Z in a state in which the electrode tabs are not connected to the respective electrodes, the electrode tab-bordering region P described above may be set based on a predetermined arrangement of the positive electrode tab and the negative electrode tab and adhesive material may preferably be applied at the surface Z such that the ratio of coverage E of adhesive material in the electrode tab-bordering region P is larger than the ratio of coverage F of adhesive material in the other region Q to the extent that the desired effects are obtained.

The proportion constituted by the area of the "region S where adhesive material is applied densely" among the area of the entire surface Z is preferably 5% or more, and more preferably 10% or more, and is preferably 60% or less, more preferably 40% or less, and even more preferably 30% or less. When the proportion constituted by the area of the "region S where adhesive material is applied densely" among the area of the entire surface Z is within any of the specific ranges set forth above, it is possible to further inhibit metal deposition at an electrode surface during charging of the secondary battery. Moreover, when the proportion constituted by the area of the "region S where adhesive material is applied densely" among the area of the entire surface Z is not more than any of the upper limits set forth above, sufficiently high output characteristics of the secondary battery can be ensured.

The proportion constituted by the area of the "region T where adhesive material is applied sparsely" among the area of the entire surface Z is preferably 40% or more, more preferably 60% or more, and even more preferably 70% or more, and is preferably 95% or less, and more preferably 90% or less. When the proportion constituted by the area of the "region T where adhesive material is applied sparsely" among the area of the entire surface Z is within any of the specific ranges set forth above, it is possible to further inhibit metal deposition at an electrode surface during charging of the secondary battery. Moreover, when the proportion constituted by the area of the "region T where adhesive material is applied sparsely" among the area of the entire surface Z is not less than any of the lower limits set forth above, sufficiently high output characteristics of the secondary battery can be ensured.

A ratio of coverage J of adhesive material in the "region S where adhesive material is applied densely" is not specifically limited so long as it is larger than a ratio of coverage K of adhesive material in the "region T where adhesive material is applied sparsely", but is preferably 1.1% or more, and more preferably 3% or more, and is preferably 30% or less, more preferably 10% or less, and even more preferably 8% or less. When the ratio of coverage J of adhesive material in the "region S where adhesive material is applied densely" is not less than any of the lower limits set forth above, it is possible to further inhibit metal deposition at an electrode surface during charging of the secondary battery. Moreover, when the ratio of coverage J of adhesive material in the "region S where adhesive material is applied densely" is not more than any of the upper limits set forth above, sufficiently high output characteristics of the secondary battery can be ensured.

The ratio of coverage K of adhesive material in the "region T where adhesive material is applied sparsely" is not specifically limited so long as it is smaller than the ratio of coverage J of adhesive material in the "region S where adhesive material is applied densely", but is preferably 0.3% or more, and more preferably 0.5% or more, and is preferably less than $0.4 \times J$ %. When the ratio of coverage K of adhesive material in the "region T where adhesive material is applied sparsely" is not less than any of the lower limits set forth above, adhesive strength of an electrode and a separator can be sufficiently ensured. Moreover, when the ratio of coverage K of adhesive material in the "region T where adhesive material is applied sparsely" is less than the upper limit set forth above, it is possible to sufficiently inhibit metal deposition at an electrode surface during charging of the secondary battery.

Note that the ratio of coverage of adhesive material in each of the "region S where adhesive material is applied densely" and the "region T where adhesive material is applied sparsely" can be adjusted by altering the arrangement pattern of adhesive material that is disposed (applied) in that region.

Specifically, in a case in which adhesive material is disposed (applied) such as to be arranged in a dotted pattern in a given region, the ratio of coverage of adhesive material in that region can be adjusted by altering the radius and the distance between centers of dots of adhesive material.

Figure 7:
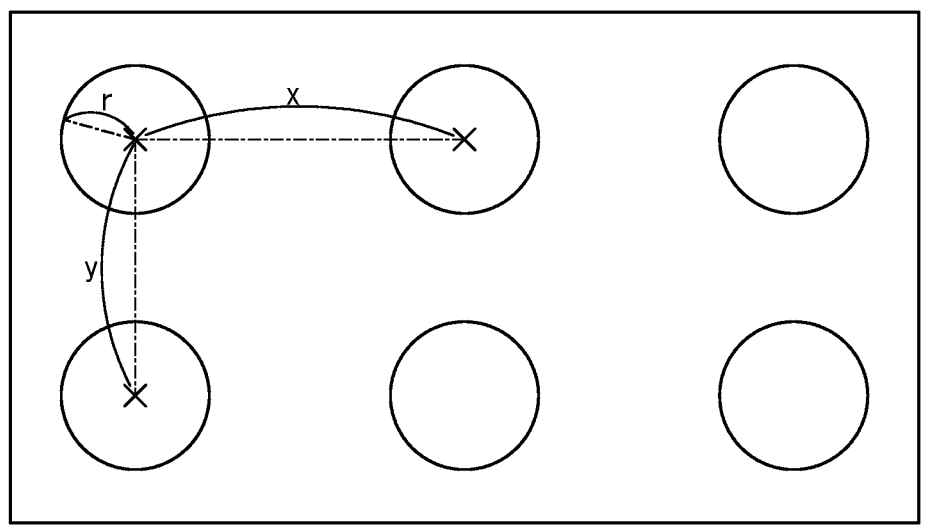
FIG. 7 is an explanatory diagram illustrating one example of an application pattern of adhesive material.

In the case of a region where adhesive material is disposed (applied) in a dotted pattern such that dots are formed at fixed intervals in two orthogonally intersecting directions as illustrated in FIG. 7, for example, the ratio of coverage of adhesive material can be determined by the following formula (1) using distances (pitches) x and y between centers of the dots and the radius r of the dots.

$$\text{Ratio of coverage of adhesive material} = \{\pi r^2/(x \cdot y)\} \times 100(\%) \quad (1)$$

Moreover, in a case in which adhesive material is disposed (applied) such as to be arranged in a striped pattern in a given region, the ratio of coverage of adhesive material in that region can be adjusted by altering the line width of application sections for adhesive material and the spacing of these application sections (line width of non-application sections).

Figure 8:
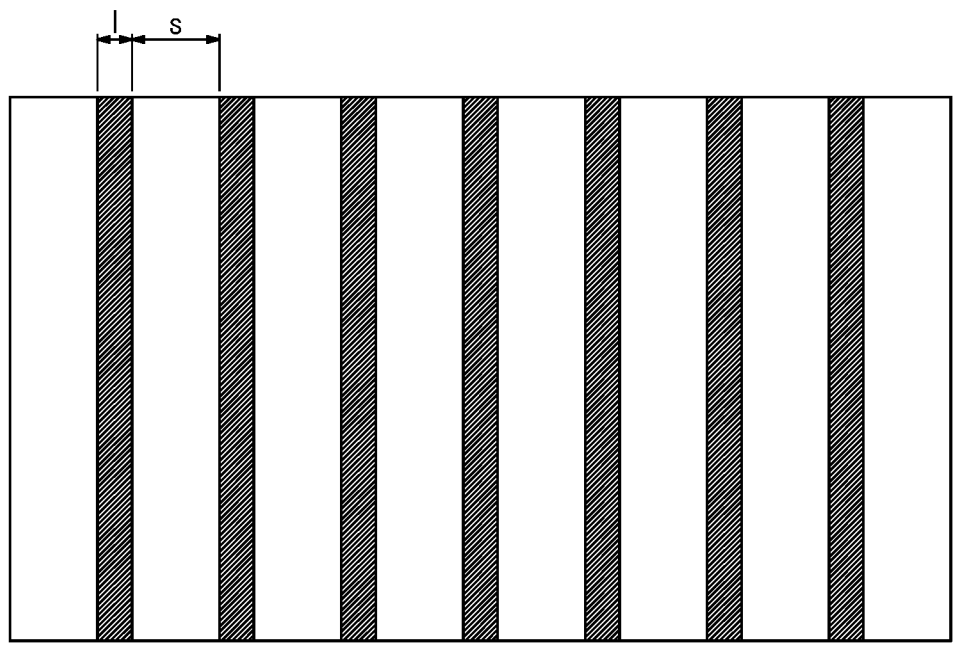
FIG. 8 is an explanatory diagram illustrating another example of an application pattern of adhesive material.

In the case of a region where adhesive material is applied in a striped pattern in which the line width of application sections for adhesive material is 1 and the spacing of the application sections (line width of non-application sections) is s as illustrated in FIG. 8, for example, the ratio of coverage of adhesive material can be determined by the following formula (2).

$$\text{Ratio of coverage of adhesive material} = \{1/(1+s)\} \times 100(\%) \quad (2)$$

The coating weight of adhesive material in the region S where adhesive material is applied densely is preferably 0.02 g/m$^2$ or more, and is preferably 0.8 g/m$^2$ or less, and more preferably 0.35 g/m$^2$ or less. When the coating weight of adhesive material in the region S where adhesive material is applied densely is not less than the lower limit set forth above, adhesive strength of an electrode and a separator can be sufficiently ensured. Moreover, when the coating weight of adhesive material in the region S where adhesive material is applied densely is not more than any of the upper limits set forth above, sufficiently high output characteristics of the secondary battery can be ensured.

The coating weight of adhesive material in the region T where adhesive material is applied sparsely is preferably 0.02 g/m$^2$ or more, and more preferably 0.03 g/m$^2$ or more, and is preferably 0.35 g/m$^2$ or less. When the coating weight of adhesive material in the region T where adhesive material is applied sparsely is not less than any of the lower limits set forth above, adhesive strength of an electrode and a separator can be sufficiently ensured. Moreover, when the coating weight of adhesive material in the region T where adhesive material is applied sparsely is not more than the upper limit set forth above, sufficiently high output characteristics of the secondary battery can be ensured.

Note that in the present specification, in a case in which a composition for adhesion containing an adhesive material and a solvent is supplied to an affixing surface, "adhesive material" in "coating weight of adhesive material" refers to material in a state in which the solvent has been removed from the composition for an adhesive layer by drying or the like.

It should be noted that adhesive material may be disposed (applied) in the same pattern throughout each region among the "region S where adhesive material is applied densely" and the "region T where adhesive material is applied sparsely" described above, or adhesive material disposed (applied) in a plurality of different patterns may be present in each of these regions.

Moreover, in each of these regions, the pattern in which adhesive material is applied may change gradually in a given fixed direction. For example, in a case in which adhesive material is applied in a dotted pattern, the radius and distance between centers of dots of the adhesive material may change gradually along a given fixed direction, whereas in a case in which adhesive material is applied in a striped pattern, the line width of application sections for the adhesive material and the spacing of these application sections (line width of non-application sections) may change gradually along a given fixed direction.

Note that the electrode tab-bordering region P described above may be a region that matches the "region S where adhesive material is applied densely" or may be a region that does not match the "region S where adhesive material is applied densely". Accordingly, just a section corresponding to the "region S where adhesive material is applied densely" may be present in the electrode tab-bordering region P or both a section corresponding to the "region S where adhesive material is applied densely" and a section corresponding to the "region T where adhesive material is applied sparsely" may be present in the electrode tab-bordering region P.

Moreover, the other region Q may be a region that matches the "region T where adhesive material is applied sparsely" or may be a region that does not match the "region T where adhesive material is applied sparsely". Accordingly, just a section corresponding to the "region T where adhesive material is applied sparsely" may be present in the other region Q or both a section corresponding to the "region S where adhesive material is applied densely" and a section corresponding to the "region T where adhesive material is applied sparsely" may be present in the other region Q.

In a case in which both a section corresponding to the "region S where adhesive material is applied densely" and a section corresponding to the "region T where adhesive material is applied sparsely" are present in a region U that is either the electrode tab-bordering region P or the other region Q, the ratio of coverage of adhesive material in the region U can be determined by the following formula (3).

$$\text{Ratio of coverage of adhesive material in region } U = (\text{Ratio of coverage of adhesive material in region } S) \times (\text{Proportion constituted by area of region } S \text{ among area of entire region } U) + (\text{Ratio of coverage of adhesive material in region } T) \times (\text{Proportion constituted by area of region } T \text{ among area of entire region } U) \quad (3)$$

The ratio of coverage E of adhesive material in the electrode tab-bordering region P is preferably larger than the ratio of coverage F of adhesive material in the other region Q.

Specifically, the ratio of coverage E of adhesive material in the electrode tab-bordering region P is preferably 1.1% or more, more preferably 1.4% or more, and even more preferably 3% or more, and is preferably 30% or less, more preferably 10% or less, and even more preferably 8% or less. When the ratio of coverage E of adhesive material in the electrode tab-bordering region P is not less than any of the lower limits set forth above, it is possible to further inhibit metal deposition at an electrode surface during charging of the secondary battery. On the other hand, when the ratio of coverage E of adhesive material in the electrode tab-bordering region P is not more than any of the upper limits set forth above, sufficiently high output characteristics of the secondary battery can be ensured.

The ratio of coverage F of adhesive material in the other region Q is preferably smaller than the ratio of coverage E of adhesive material in the electrode tab-bordering region P.

Specifically, the ratio of coverage F of adhesive material in the other region Q is preferably 0.5% or more, and more preferably 0.7% or more, and is preferably less than 0.4×E %. When the ratio of coverage F of adhesive material in the other region Q is not less than any of the lower limits set forth above, adhesive strength of an electrode and a separator can be sufficiently ensured. On the other hand, when the ratio of coverage F of adhesive material in the other region Q is less than the upper limit set forth above, sufficiently high output characteristics of the secondary battery can be ensured.

A ratio (E/F) of the ratio of coverage E of adhesive material in the electrode tab-bordering region P and the ratio of coverage F of adhesive material in the other region Q is preferably 1.5 or more, more preferably 1.8 or more, and even more preferably 2.5 or more, and is preferably 9.0 or less, and more preferably 5.0 or less. When the ratio (E/F) of the ratio of coverage E of adhesive material in the electrode tab-bordering region P and the ratio of coverage F of adhesive material in the other region Q is not less than any of the lower limits set forth above, it is possible to further inhibit metal deposition at an electrode surface during charging of the secondary battery. On the other hand, when the ratio (E/F) of the ratio of coverage E of adhesive material in the electrode tab-bordering region P and the ratio of coverage F of adhesive material in the other region Q is not more than any of the upper limits set forth above, a balance of high levels of adhesive strength of an electrode and a separator and output characteristics of the secondary battery can be achieved.

The presently disclosed secondary battery preferably satisfies either or both of: (i) a ratio of coverage E1 in the positive electrode tab-bordering region P1 being larger than a ratio of coverage F1 in another region Q1 that is a region other than the positive electrode tab-bordering region P1 at the surface Z; and (ii) a ratio of coverage E2 in the negative electrode tab-bordering region P2 being larger than a ratio of coverage F2 in another region Q2 that is a region other than the negative electrode tab-bordering region P2 at the surface Z, and more preferably satisfies both (i) and (ii) set forth above from a viewpoint of further inhibiting metal deposition at an electrode surface during charging of the secondary battery.

The coating weight of adhesive material in the electrode tab-bordering region P is preferably 0.02 g/m² or more, and is preferably 0.8 g/m² or less, and more preferably 0.35 g/m² or less. When the coating weight of adhesive material in the electrode tab-bordering region P is not less than the lower limit set forth above, adhesive strength of an electrode and a separator can be sufficiently ensured. Moreover, when the coating weight of adhesive material in the electrode tab-bordering region P is not more than any of the upper limits set forth above, sufficiently high output characteristics of the secondary battery can be ensured.

The coating weight of adhesive material in the other region Q is preferably 0.02 g/m² or more, and more preferably 0.03 g/m² or more, and is preferably 0.35 g/m² or less. When the coating weight of adhesive material in the other region Q is not less than any of the lower limits set forth above, adhesive strength of an electrode and a separator can be sufficiently ensured. Moreover, when the coating weight of adhesive material in the other region Q is not more than the upper limit set forth above, sufficiently high output characteristics of the secondary battery can be ensured.

—Details of Adhesive Material—

Any adhesive material that is used in the field of secondary batteries can be used as the adhesive material without any specific limitations so long as it does not impair battery reactions. In particular, an adhesive material formed of a polymer is preferable as the adhesive material. Note that the adhesive material may be formed of just one type of polymer or may be formed of two or more types of polymers.

Examples of polymers that can be used as the adhesive material include, but are not specifically limited to, fluoropolymers such as polyvinylidene fluoride and vinylidene fluoride-hexafluoropropylene copolymer (PVdF-HFP); conjugated diene polymers such as styrene-butadiene copolymer (SBR) and acrylonitrile-butadiene copolymer (NBR); hydrogenated products of conjugated diene polymers; polymers that include a (meth)acrylic acid alkyl ester monomer unit (acrylic polymers); and polyvinyl alcohol polymers such as polyvinyl alcohol (PVA).

Note that in the present disclosure, "(meth)acrylic acid" is used to indicate "acrylic acid" and/or "methacrylic acid".

The form of the adhesive material formed of a polymer is not specifically limited and may be a particulate form, a non-particulate form, or a combination of a particulate form and a non-particulate form.

Note that in a case in which the adhesive material formed of a polymer is a particulate polymer, the adhesive material of that particulate polymer may be monophase structure particles that are formed from a single polymer or may be heterophase structure particles that are formed through physical or chemical bonding of two or more different polymers.

Specific examples of heterophase structures include a core-shell structure in which a central portion (core portion) and an outer shell (shell portion) of a spherical particle are formed from different polymers; and a side-by-side structure in which two or more polymers are disposed alongside each other.

Figure 9:
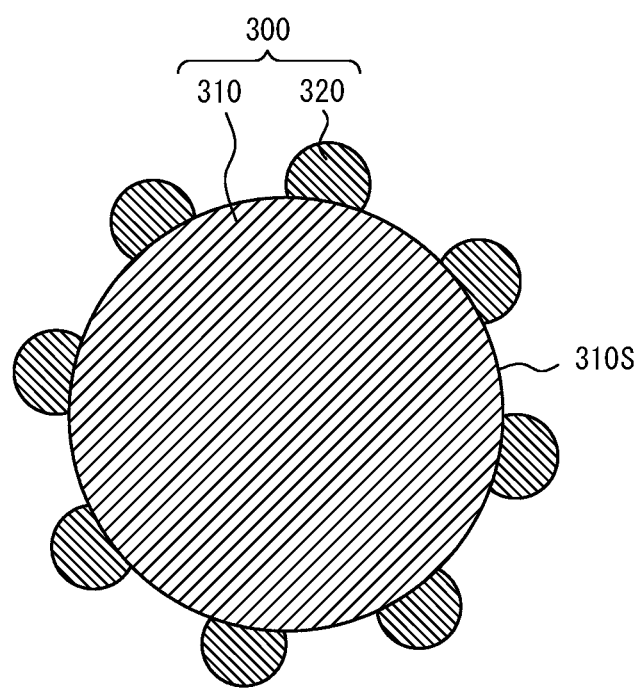
FIG. 9 is a cross-sectional view schematically illustrating the structure of one example of a particulate polymer.

Note that the term "core-shell structure" as used in the present disclosure is inclusive of a structure in which a shell portion completely covers an outer surface of a core portion and also of a structure in which a shell portion partially covers an outer surface of a core portion such as illustrated in FIG. 9, for example.

In terms of external appearance, even in a situation in which the outer surface of a core portion appears to be completely covered by a shell portion, the shell portion is still considered to be a shell portion that partially covers the outer surface of the core portion so long as pores are formed that pass between inside and outside of the shell portion. Accordingly, a particulate polymer that includes a shell portion having fine pores that pass between an outer surface of the shell portion (i.e., a circumferential surface of the particulate polymer) and an outer surface of a core portion, for example, corresponds to a particulate polymer in which a shell portion partially covers an outer surface of a core portion.

The degree of swelling in electrolyte solution (solution having $LiPF_6$ dissolved in a concentration of 1 mol/L in a mixed solvent of ethylene carbonate/diethyl carbonate in a volume ratio of 3/7) of the adhesive material (hereinafter, also referred to simply as the "degree of swelling") is preferably 110% or more, and is preferably 1500% or less, more preferably 1300% or less, and particularly preferably 1000% or less. When the degree of swelling of the adhesive material is not more than any of the upper limits set forth above, permeability of electrolyte solution to a central part of a positive electrode or a negative electrode can be improved.

Note that the degree of swelling in electrolyte solution of the adhesive material can be measured by a method described in the EXAMPLES section of the present specification.

—Particulate Polymer—

A particulate polymer is preferably used as the adhesive material. Although either of a particulate polymer having a core-shell structure and a particulate polymer not having a core-shell structure may be used as the particulate polymer, it is preferable to use at least a particulate polymer having a core-shell structure, and more preferable to use a particulate polymer having a core-shell structure and a particulate polymer not having a core-shell structure in combination.

In a case in which a particulate polymer having a core-shell structure and a particulate polymer not having a core-shell structure are used in combination, the mass ratio of the particulate polymer having a core-shell structure and the particulate polymer not having a core-shell structure in the adhesive material can be adjusted as appropriate to the extent that the desired effects are obtained.

=Particulate Polymer Having Core-Shell Structure=

The particulate polymer having a core-shell structure is a component that functions as a binder in adhesive material for adhering battery members, such as a separator and an electrode, to each other. By using the particulate polymer having a core-shell structure as a binder, battery members can be strongly adhered to each other via the adhesive material while also causing the secondary battery to display excellent output characteristics.

The particulate polymer has a core-shell structure including a core portion and a shell portion covering an outer surface of the core portion. The shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion.

FIG. 9 illustrates the cross-sectional structure of one example of the particulate polymer. A particulate polymer 300 illustrated in FIG. 9 has a core-shell structure including a core portion 310 and a shell portion 320. The core portion 310 is a portion that is further inward than the shell portion 320 in the particulate polymer 300. The shell portion 320 is a portion that covers an outer surface 310S of the core portion 310 and is normally an outermost portion in the particulate polymer 300. In the example illustrated in FIG. 9, the shell portion 320 partially covers the outer surface 310S of the core portion 310 rather than completely covering the outer surface 310S of the core portion 310.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization. However, from a viewpoint of more noticeably displaying the expected effects, it is preferable that the particulate polymer is composed of only the core portion and the shell portion.

The glass-transition temperature of a polymer of the core portion in the particulate polymer is preferably −30° C. or higher, and more preferably −20° C. or higher, and is preferably 200° C. or lower, more preferably 100° C. or lower, and particularly preferably 50° C. or lower. When the glass-transition temperature of the polymer of the core portion is −30° C. or higher, battery members can be more strongly adhered to each other via the adhesive material. On the other hand, when the glass-transition temperature of the polymer of the core portion is 200° C. or lower, polymerization stability of the particulate polymer can be ensured.

Note that the glass-transition temperature of the polymer of the core portion can be adjusted by altering the types and proportions of monomers used to produce the polymer of the core portion, for example.

Examples of monomers that can be used to produce the polymer of the core portion include vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylic acid ester monomers such as methyl acrylate, ethyl acrylate, butyl acrylate, 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio.

Note that in the present disclosure, "(meth)acryl" is used to indicate "acryl" and/or "methacryl", whereas "(meth) acrylonitrile" is used to indicate "acrylonitrile" and/or "methacrylonitrile".

Of these monomers, the use of at least a (meth)acrylic acid ester monomer as a monomer used to produce the polymer of the core portion is preferable from a viewpoint of more strongly adhering battery members to each other via the adhesive material, with the combined use of a (meth) acrylic acid ester monomer and an aromatic vinyl monomer or the combined use of a (meth)acrylic acid ester monomer and a (meth)acrylonitrile monomer being more preferable, and the combined use of a (meth)acrylic acid ester monomer and an aromatic vinyl monomer being particularly preferable. In other words, the polymer of the core portion preferably includes at least a (meth)acrylic acid ester monomer unit, more preferably includes a (meth)acrylic acid ester monomer unit and an aromatic vinyl monomer unit or (meth)acrylonitrile monomer unit, and even more preferably includes a (meth)acrylic acid ester monomer unit and an aromatic vinyl monomer unit.

The phrase "includes a monomer unit" as used in the present disclosure means that "a polymer obtained with the monomer includes a repeating unit derived from the monomer".

Moreover, the term "(meth)acrylic acid ester monomer" as used in the present disclosure refers to a monofunctional (meth)acrylic acid ester monomer that includes only one group displaying polymerization reactivity.

The proportion constituted by a (meth)acrylic acid ester monomer unit in the polymer of the core portion when all repeating units (all monomer units) included in the polymer of the core portion are taken to be 100 mass % is, from a viewpoint of more strongly adhering battery members to each other via the adhesive material, preferably 5 mass % or more, more preferably 10 mass % or more, and particularly preferably 20 mass % or more, and is preferably 80 mass % or less, and more preferably 70 mass % or less.

Moreover, in a case in which the polymer of the core portion includes a (meth)acrylic acid ester monomer unit and an aromatic vinyl monomer unit, the proportion constituted by the aromatic vinyl monomer unit in the polymer of the core portion when all repeating units (all monomer units) included in the polymer of the core portion are taken to be 100 mass % is, from a viewpoint of more strongly adhering battery members to each other via the adhesive material, preferably 15 mass % or more, more preferably 20 mass % or more, and particularly preferably 25 mass % or more, and is preferably 95 mass % or less, more preferably 80 mass % or less, and particularly preferably 65 mass % or less.

Furthermore, in a case in which the polymer of the core portion includes a (meth)acrylic acid ester monomer unit and a (meth)acrylonitrile monomer unit, the proportion constituted by the (meth)acrylonitrile monomer unit in the polymer of the core portion when all repeating units (all monomer units) included in the polymer of the core portion are taken to be 100 mass % is, from a viewpoint of more strongly adhering battery members to each other via the adhesive material, preferably 5 mass % or more, more preferably 10 mass % or more, and particularly preferably 15 mass % or more, and is preferably 30 mass % or less, and more preferably 25 mass % or less.

The polymer of the core portion can also include an acid group-containing monomer unit. Examples of acid group-containing monomers include monomers that include an acid group such as carboxy group-containing monomers, sulfo group-containing monomers, and phosphate group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth)acryloyl" is used to indicate "acryloyl" and/or "methacryloyl".

Of these acid group-containing monomers, carboxy group-containing monomers are preferable, of which, monocarboxylic acids are preferable, and (meth)acrylic acid is more preferable.

One acid group-containing monomer may be used individually, or two or more acid group-containing monomers may be used in combination in a freely selected ratio.

The proportion constituted by an acid group-containing monomer unit in the polymer of the core portion when all repeating units (all monomer units) included in the polymer of the core portion are taken to be 100 mass % is preferably 0.1 mass % or more, and more preferably 1 mass % or more, and is preferably 15 mass % or less, and more preferably 10 mass % or less. By setting the proportion constituted by an acid group-containing monomer unit within any of the ranges set forth above, dispersibility of the polymer of the core portion can be increased in production of the particulate polymer, which facilitates formation of a shell portion partially covering the outer surface of the core portion with respect to the outer surface of the polymer of the core portion.

The polymer of the core portion preferably includes a cross-linkable monomer unit in addition to the monomer units described above. A cross-linkable monomer is a monomer that can form a cross-linked structure during or after polymerization by heating or by irradiation with energy rays.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers that include an epoxy group such as allyl glycidyl ether and glycidyl methacrylate; and γ-methacryloxypropyltrimethoxysilane. Of these cross-linkable monomers, di(meth)acrylic acid ester monomers are more preferable. One of these cross-linkable monomers may be used individually, or two or more of these cross-linkable monomers may be used in combination in a freely selected ratio.

The proportion constituted by a cross-linkable monomer unit in the polymer of the core portion when all repeating units (all monomer units) included in the polymer of the core portion are taken to be 100 mass % is preferably 0.1 mass % or more, more preferably 0.2 mass % or more, and particularly preferably 0.4 mass % or more, and is preferably 10 mass % or less, more preferably 5 mass % or less, and particularly preferably 3 mass % or less. By setting the proportion constituted by a cross-linkable monomer unit within any of the ranges set forth above, battery members can be more strongly adhered to each other via the adhesive material.

The glass-transition temperature of a polymer of the shell portion in the particulate polymer is preferably 70° C. or higher, more preferably 80° C. or higher, and particularly preferably 90° C. or higher, and is preferably 140° C. or lower, more preferably 130° C. or lower, and particularly preferably 120° C. or lower. When the glass-transition temperature of the polymer of the shell portion is 70° C. or higher, output characteristics of the secondary battery can be improved. On the other hand, when the glass-transition temperature of the polymer of the shell portion is 140° C. or lower, battery members can be even more strongly adhered to each other via the adhesive material.

Note that the glass-transition temperature of a polymer can be measured by a method described in the EXAMPLES section of the present specification.

Also note that the glass-transition temperature of the polymer of the shell portion can be adjusted by altering the types and proportions of monomers used to produce the polymer of the shell portion, for example.

The glass-transition temperature of the polymer of the shell portion is preferably at least 10° C. higher than the previously described glass-transition temperature of the polymer of the core portion, more preferably at least 30° C. higher than the glass-transition temperature of the polymer of the core portion, and particularly preferably at least 50° C. higher than the glass-transition temperature of the polymer of the core portion from a viewpoint of retaining the form of the particulate polymer after adhering battery members to each other and suppressing an increase of resistance.

Examples of monomers that can be used to produce the polymer of the shell portion include the same monomers as listed as examples of monomers that can be used to produce the polymer of the core portion. One of such monomers may be used individually, or two or more of such monomers may be used in combination in a freely selected ratio.

Of these monomers, the use of an aromatic vinyl monomer as a monomer used to produce the polymer of the shell portion is preferable from a viewpoint of more strongly adhering battery members to each other via the adhesive material. In other words, the polymer of the shell portion preferably includes an aromatic vinyl monomer unit.

The proportion constituted by an aromatic vinyl monomer unit in the polymer of the shell portion when all repeating units (all monomer units) included in the polymer of the shell portion are taken to be 100 mass % is, from a viewpoint of even more strongly adhering battery members to each other via the adhesive material in electrolyte solution, preferably 85 mass % or more, preferably 90 mass % or more, and particularly preferably 95 mass % or more, and is preferably 99 mass % or less.

Besides an aromatic vinyl monomer unit, the polymer of the shell portion can include an acid group-containing monomer unit. Examples of acid group-containing monomers include monomers that include an acid group such as carboxy group-containing monomers, sulfo group-containing monomers, and phosphate group-containing monomers. Specifically, examples of acid group-containing monomers that can be used include the same monomers as the acid group-containing monomers that can be used to form the core portion.

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the polymer of the shell portion when all repeating units (all monomer units) included in the polymer of the shell portion are taken to be 100 mass % is preferably 0.1 mass % or more, and is preferably 15 mass % or less, more preferably 10 mass % or less, and particularly preferably 5 mass % or less. By setting the proportion constituted by an acid group-containing monomer unit within any of the ranges set forth above, dispersibility of the particulate polymer can be improved, and battery members can be even more strongly adhered to each other via the adhesive material.

A mass ratio of the polymer of the core portion and the polymer of the shell portion (core portion/shell portion) in the particulate polymer having a core-shell structure is preferably 5/5 or more, and more preferably 6/4 or more, and is preferably 9/1 or less, and more preferably 8/2 or less. When the mass ratio of the polymer of the core portion and the polymer of the shell portion (core portion/shell portion) is within any of the specific ranges set forth above, battery members can be more strongly adhered to each other via the adhesive material in electrolyte solution.

The volume-average particle diameter of the particulate polymer having a core-shell structure is preferably 100 nm or more, and more preferably 300 nm or more, and is preferably 1,000 nm or less, more preferably 900 nm or less, even more preferably 800 nm or less, and further preferably 700 nm or less. When the volume-average particle diameter of the particulate polymer having a core-shell structure is within any of the specific ranges set forth above, battery members can be more strongly adhered to each other via the adhesive material.

Note that the volume-average particle diameter of the particulate polymer can be measured by a method described in the EXAMPLES section of the present specification.

The particulate polymer having the core-shell structure described above can be produced by, for example, performing stepwise polymerization in which monomers for the polymer of the core portion and monomers for the polymer of the shell portion are used and in which the ratio of these monomers is changed over time. Specifically, the particulate polymer can be produced by continuous, multi-step emulsion polymerization or multi-step suspension polymerization in which a polymer of a preceding step is then covered by a polymer of a subsequent step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing monomers for forming the core portion and the emulsifier, and performing emulsion polymerization as one batch to obtain a particulate polymer that forms the core portion. The particulate polymer having the core-shell structure set forth above can then be obtained by performing polymerization of monomers for forming the shell portion in the presence of the particulate polymer forming the core portion.

In a case in which a particulate polymer in which the outer surface of a core portion is partially covered by a shell portion is to be produced, it is preferable that the monomers for forming the polymer of the shell portion are supplied into the polymerization system continuously or divided into a plurality of portions. As a result of the monomers for forming the polymer of the shell portion being supplied into the polymerization system in portions or continuously, the polymer forming the shell portion can be formed as particles that bond to the core portion such as to form a shell portion that partially covers the core portion.

=Particulate Polymer not Having Core-Shell Structure=

The adhesive material may contain a particulate polymer not having a core-shell structure in addition to the particulate polymer having the core-shell structure described above.

The glass-transition temperature of the particulate polymer not having a core-shell structure is preferably −40° C. or higher, more preferably −35° C. or higher, and even more preferably −30° C. or higher, and is preferably 0° C. or lower, more preferably −10° C. or lower, and even more preferably −20° C. or lower. When the glass-transition temperature of the particulate polymer not having a core-shell structure is −40° C. or higher, battery members can be more strongly adhered to each other via the adhesive material. On the other hand, when the glass-transition temperature of the particulate polymer not having a core-shell structure is 0° C. or lower, polymerization stability of the particulate polymer can be ensured.

Examples of monomers that can be used to produce the particulate polymer not having a core-shell structure include the same monomers as listed as examples of monomers that can be used to produce the polymer of the core portion of the particulate polymer having the core-shell structure described above. For example, it is preferable to use a (meth)acrylic acid ester monomer, an aromatic vinyl monomer, an acid group-containing monomer, a cross-linkable monomer, and the like as monomers used to produce the particulate polymer not having a core-shell structure. One of such monomers may be used individually, or two or more of such monomers may be used in combination in a freely selected ratio.

The proportion constituted by a (meth)acrylic acid ester monomer unit in the particulate polymer not having a core-shell structure when all repeating units (all monomer units) included in the polymer are taken to be 100 mass % is, from a viewpoint of more strongly adhering battery members to each other via the adhesive material, preferably 40 mass % or more, more preferably 50 mass % or more, and even more preferably 60 mass % or more, and is preferably 85 mass % or less, more preferably 80 mass % or less, and even more preferably 75 mass % or less.

The proportion constituted by an aromatic vinyl monomer unit in the particulate polymer not having a core-shell structure when all repeating units (all monomer units) included in the polymer are taken to be 100 mass % is, from a viewpoint of more strongly adhering battery members to each other via the adhesive material, preferably 10 mass % or more, more preferably 15 mass % or more, and even more preferably 20 mass % or more, and is preferably 40 mass % or less, more preferably 35 mass % or less, and even more preferably 30 mass % or less.

The proportion constituted by an acid group-containing monomer unit in the particulate polymer not having a core-shell structure when all repeating units (all monomer units) included in the polymer are taken to be 100 mass % is preferably 0.5 mass % or more, more preferably 1 mass % or more, and even more preferably 2 mass % or more, and is preferably 10 mass % or less, more preferably 7 mass % or less, and even more preferably 5 mass % or less. By setting the proportion constituted by an acid group-containing monomer unit in the particulate polymer not having a core-shell structure within any of the ranges set forth above, dispersibility of the particulate polymer can be increased.

The proportion constituted by a cross-linkable monomer unit in the particulate polymer not having a core-shell structure when all repeating units (all monomer units) included in the polymer are taken to be 100 mass % is, from a viewpoint of more strongly adhering battery members to each other via the adhesive material, preferably 0.2 mass % or more, more preferably 0.5 mass % or more, and even more preferably 1 mass % or more, and is preferably 5 mass % or less, more preferably 4 mass % or less, and even more preferably 3 mass % or less.

The volume-average particle diameter of the particulate polymer not having a core-shell structure is preferably 50 nm or more, more preferably 100 nm or more, and even more preferably 200 nm or more, and is preferably 600 nm or less, more preferably 500 nm or less, and even more preferably 400 nm or less. When the volume-average particle diameter of the particulate polymer not having a core-shell structure is within any of the specific ranges set forth above, battery members can be more strongly adhered to each other via the adhesive material.

The particulate polymer not having a core-shell structure can be produced, for example, through polymerization of a monomer composition containing the monomers described above, carried out in an aqueous solvent such as water, for example, but is not specifically limited to being produced in this manner. The proportion constituted by each monomer in the monomer composition is normally the same as the proportion constituted by each monomer unit in the particulate polymer not having a core-shell structure. Commonly known polymerization methods and polymerization reactions can be adopted as the polymerization method and the polymerization reaction without any specific limitations.

—Other Details—

Adhesive material that is present in the electrode tab-bordering region P and adhesive material that is present in the other region Q may be the same or different.

Accordingly, the same adhesive material may be applied in both the previously described "region S where adhesive material is applied densely" and "region T where adhesive material is applied sparsely", or different adhesive materials may be applied in these regions.

Although the preceding "Application method of adhesive material" section describes a case in which adhesive material is applied such that a "region S where adhesive material is applied densely" and a "region T where adhesive material is applied sparsely" are present at the surface Z, the laminate in the presently disclosed secondary battery is not limited to this case, and adhesive material may be applied such that an "application region S1" is present instead of the "region S where adhesive material is applied densely" and an "application region S2" is present instead of the "region T where adhesive material is applied sparsely". In other words, adhesive material may be applied such that an "application region S1" and an "application region S2" are present at the surface Z.

The ratio of coverage and/or coating weight of adhesive material in each of the "application region S1" and the "application region S2" can be set within the same ranges as the preferred ranges for the ratio of coverage and/or coating weight of adhesive material in the previously described "region S where adhesive material is applied densely". Moreover, adhesive material may be applied such that the ratio of coverage and/or coating weight of adhesive material are the same in both the "application region S1" and the "application region S2".

Adhesive material that is applied in the "application region S1" and adhesive material that is applied in the "application region S2" are set as different adhesive materials. Through appropriate selection of different adhesive materials as the adhesive material applied in the "application region S1" and the adhesive material applied in the "application region S2", it is possible to make the resistance A per unit area of the electrode tab-bordering region P larger than the resistance B per unit area of the other region Q.

For example, a particulate polymer M1 and a particulate polymer M2 that differ in terms of degree of swelling can be used as the adhesive material applied in the "application region S1" and the adhesive material applied in the "application region S2".

The degree of swelling in electrolyte solution (solution having $LiPF_6$ dissolved in a concentration of 1 mol/L in a mixed solvent of ethylene carbonate/diethyl carbonate in a volume ratio of 3/7) of the particulate polymer M1 contained in the adhesive material that is applied in the "application region S1" is preferably 800% or more, and more preferably 1000% or more, and is preferably 1300% or less.

Moreover, the degree of swelling in electrolyte solution (solution having $LiPF_6$ dissolved in a concentration of 1 mol/L in a mixed solvent of ethylene carbonate/diethyl carbonate in a volume ratio of 3/7) of the particulate polymer M2 contained in the adhesive material that is applied in the "application region S2" is preferably 110% or more, and is preferably less than 800%, more preferably 500% or less, and even more preferably 300% or less.

Through the degrees of swelling of the particulate polymers M1 and M2 being within any of the specific ranges set forth above, it is possible to make the resistance A per unit area of the electrode tab-bordering region P larger than the resistance B per unit area of the other region Q.

Note that particulate polymers having a core-shell structure such as previously described in the "Details of adhesive material" section can, for example, be used as the particulate polymers M1 and M2. Of particulate polymers having a core-shell structure such as previously described, a particulate polymer in which the polymer of the core portion includes a (meth)acrylic acid ester monomer unit and a (meth)acrylonitrile monomer unit is preferable as the particulate polymer M1, whereas a particulate polymer in which the polymer of the core portion includes a (meth) acrylic acid ester monomer unit and an aromatic vinyl monomer unit is preferable as the particulate polymer M2.

Moreover, particulate polymers having different structures may be used as the adhesive material applied in the "application region S1" and the adhesive material applied in the "application region S2", for example. More specifically, a particulate polymer having a core-shell structure may be used as a particulate polymer M3 that is contained in the adhesive material applied in the "application region S1" and a particulate polymer not having a core-shell structure may be used as a particulate polymer M4 that is contained in the adhesive material applied in the "application region S2". Note that a particulate polymer having a core-shell structure such as previously described in the "Details of adhesive material" section, for example, can be used as the particulate polymer M3. Moreover, a particulate polymer composed of only a polymer having the same chemical composition as the polymer of a core portion in a particulate polymer having a core-shell structure such as previously described in the "Details of adhesive material" section, for example, can be used as the particulate polymer M4.

<<Production Method of Laminate>>

A method of producing the laminate in the presently disclosed secondary battery includes a step (A) of producing an affixed body and a step (B) of cutting the affixed body and, in a case in which the affixed body produced in the step (A) does not include a positive electrode, may optionally further include a step (C) of affixing a positive electrode to a cut body obtained through cutting of the affixed body in the step (B). Note that besides the steps (A), (B), and (C) described above, the method of producing the laminate in the presently disclosed secondary battery may further include a step of connecting electrode tabs (positive electrode tab and negative electrode tab) to the electrodes (positive electrode and negative electrode).

[Step (A)]

The affixed body produced in the step (A) may be (I) or (II) described below.

(I) An affixed body (hereinafter, also referred to as "affixed body (I)") that includes an elongated negative electrode web or a negative electrode (hereinafter, the "negative electrode web or negative electrode" is also referred to as a "negative electrode material"), an elongated first separator web affixed to one surface of the negative electrode material, and an elongated second separator web affixed to the other surface of the negative electrode material, and optionally includes a positive electrode affixed to a surface of the first separator web at the opposite side thereof to the negative electrode material (II) An affixed body (hereinafter, also referred to as "affixed body (II)") that includes a negative electrode material formed of an elongated negative electrode web, an elongated first separator web, a positive electrode, and an elongated second separator web affixed in stated order In the method of producing the laminate in the presently disclosed secondary battery, a laminate that includes a negative electrode, a first separator affixed to one surface of the negative electrode, a positive electrode affixed to a surface of the first separator at the opposite side thereof to the negative electrode, and a second separator affixed to the other surface of the negative electrode such as illustrated in FIGS. 1A and 1B, for example, is normally obtained in a case in which the affixed body (I) is produced in the step (A).

Also note that in a case in which the affixed body (I) does not include a positive electrode, the step (C) is normally performed after the step (B) to produce a laminate in the method of producing the laminate in the presently disclosed secondary battery.

Moreover, in the method of producing the laminate in the presently disclosed secondary battery, a laminate that includes a negative electrode, a first separator affixed to one surface of the negative electrode, a positive electrode affixed to a surface of the first separator at the opposite side thereof to the negative electrode, and a second separator affixed to a surface of the positive electrode at the opposite side thereof to the first separator such as illustrated in FIG. 3, for example, is normally obtained in a case in which the affixed body (II) is produced in the step (A).

Production of an affixed body in the step (A) is normally carried out by applying adhesive material at an affixing surface of members that are to be affixed to each other, and then affixing members of the affixed body to each other via the adhesive material. In other words, the step (A) includes a step (a1) of applying adhesive material at an affixing surface Y of a negative electrode material and a separator web that is to be affixed to the negative electrode material and can further include a step (a2) of applying adhesive material at an affixing surface X of a separator web and a positive electrode.

Note that the "separator web that is to be affixed to the negative electrode material" is a first separator web and a second separator web in a case in which the affixed body that is to be produced is the affixed body (I) and is a first separator web in a case in which the affixed body that is to be produced is the affixed body (II). Moreover, the member onto which adhesive material is applied may be just one of the members that are to be affixed to each other or may be both of the members that are to be affixed to each other.

Figure 10:
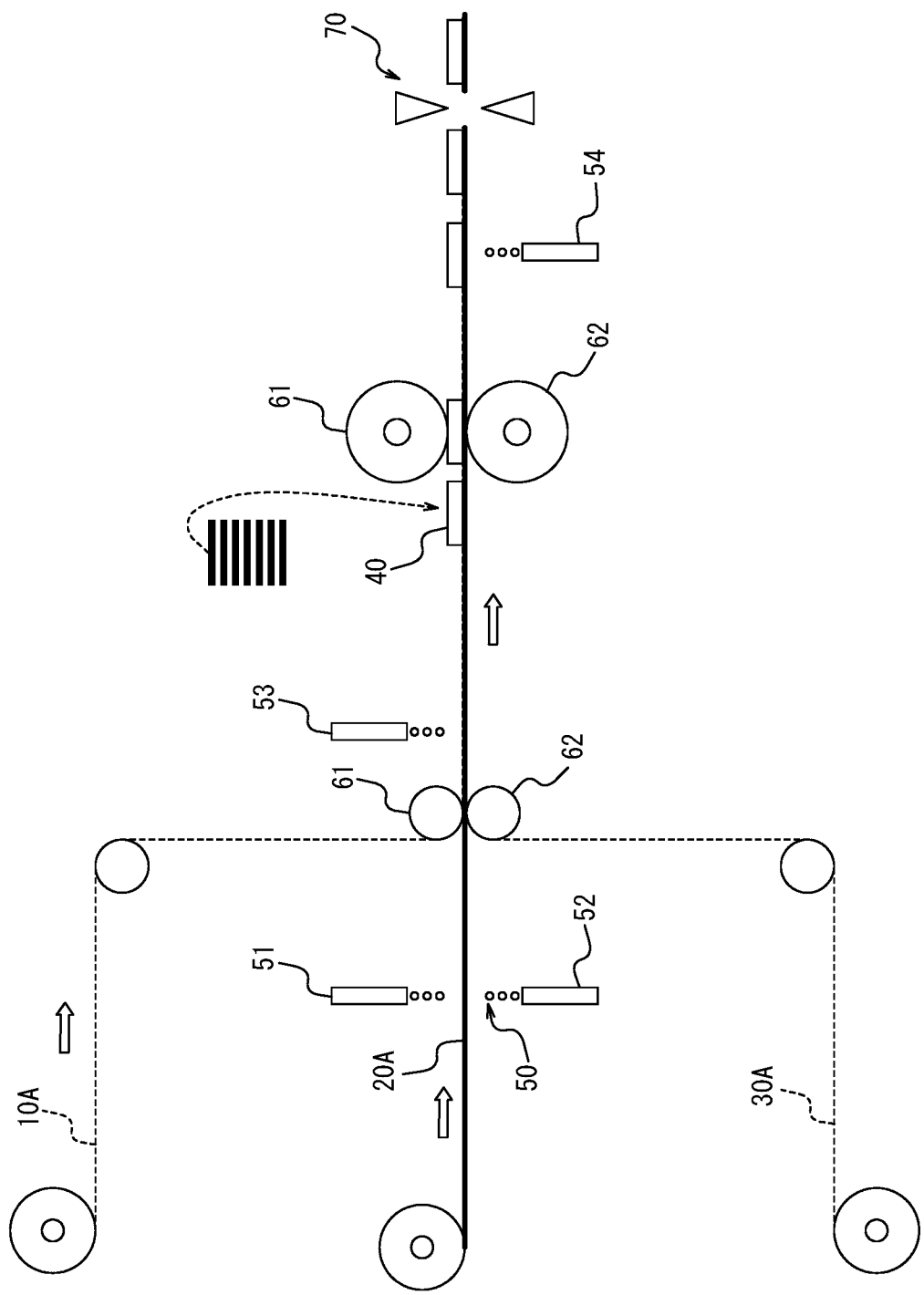
FIG. 10 is an explanatory diagram illustrating one example of a production process of a laminate in a presently disclosed secondary battery.

Specifically, the affixed body (I) can be produced as illustrated in FIG. 10, for example, in the step (A).

In FIG. 10, an elongated first separator web 10A that has been fed from a first separator web roll is affixed to one surface of a negative electrode material formed of an elongated negative electrode web 20A that has been fed from a negative electrode web roll via adhesive material that has been supplied from a coating machine 51, and an elongated second separator web 30A that has been fed from a second separator web roll is affixed to the other surface of the negative electrode material formed of the negative electrode web 20A via adhesive material that has been supplied from a coating machine 52. Note that the affixing can be performed using pressure bonding rollers 61 and 62, for example. Positive electrodes 40 are affixed at a specific arrangement pitch to a surface of the first separator web 10A at the opposite side thereof to the negative electrode web 20A via adhesive material that has been supplied from a coating machine 53, and, in this manner, an affixed body (I) that includes a positive electrode is obtained.

Note that in FIG. 10, adhesive material is supplied from a coating machine 54 to a surface of the second separator web 30A at the opposite side thereof to the negative electrode web 20A so that when laminates obtained by cutting the affixed body between positive electrodes 40 that are adjacent in the longitudinal direction are stacked in order to produce a stack, the laminates can be adhered well to each other.

Figure 11:
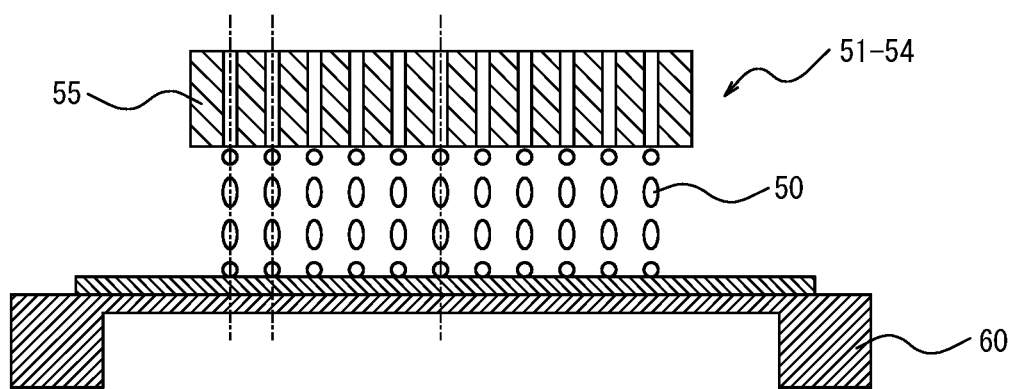
FIG. 11 is an explanatory diagram illustrating one example of a coating machine (nozzle head) illustrated in FIG. 10.

FIG. 11 is an explanatory diagram illustrating one example of a coating machine (nozzle head) illustrated in FIG. 10.

In FIG. 11, droplets 50 of adhesive material are applied onto a substrate 60 via nozzles 55 of a coating machine 51-54.

Note that the method by which an affixed body is produced in the step (A) is not limited to the example described above. For example, the coating machine 54 may supply adhesive material to a cut body obtained after cutting of the affixed body in FIG. 10.

—Negative Electrode Material and Positive Electrode—

An electrode that is obtained by cutting an elongated electrode web (negative electrode web or positive electrode web) can be used as an electrode (negative electrode or positive electrode) without any specific limitations. Moreover, an electrode web that is formed of an electrode substrate having an electrode mixed material layer (negative electrode mixed material layer or positive electrode mixed material layer) formed at one surface or both surfaces of an elongated current collector or an electrode web that has a porous membrane layer further formed on an electrode mixed material layer of an electrode substrate can be used as an electrode web (negative electrode web or positive electrode web).

Note that any current collector, electrode mixed material layer, and porous membrane layer that can be used in the field of secondary batteries, such as any of those described in JP2013-145763A, for example, can be used as the current collector, electrode mixed material layer, and porous membrane layer without any specific limitations. The porous membrane layer is a layer that contains non-conductive particles such as described in JP2013-145763A, for example.

—Separator Web—

A separator web that is formed of an elongated separator substrate or a separator web that has a porous membrane layer formed at one surface or both surfaces of an elongated separator substrate can, for example, be used as a separator web without any specific limitations.

Note that any separator substrate and porous membrane layer that can be used in the field of secondary batteries, such as any of those described in JP2012-204303A and JP2013-145763A, for example, can be used as the separator substrate and the porous membrane layer without any specific limitations.

In the step (a1) in which adhesive material is applied at an affixing surface Y with a separator web that is to be affixed to the negative electrode material or in the step (a2) in which adhesive material is applied at an affixing surface X with a separator web that is to be affixed to the positive electrode, it is preferable that adhesive material is applied at a surface Z, which is either or both of the affixing surfaces X and Y, such that a ratio of coverage E of adhesive material in the previously described electrode tab-bordering region P is larger than a ratio of coverage F of adhesive material in the other region Q. This makes it possible to further inhibit metal deposition at an electrode surface during charging of the secondary battery.

The method by which adhesive material is applied at the surface Z such that the ratio of coverage E of adhesive material in the electrode tab-bordering region P is larger than the ratio of coverage F of adhesive material in the other region Q may, for example, be a method of applying adhesive material that was previously described in the "Surface Z, electrode tabs (positive electrode tab and negative electrode tab), and electrode tab-bordering region P" section. Moreover, ranges for values of the ratio of coverage E of adhesive material in the electrode tab-bordering region P, the ratio of coverage F of adhesive material in the other region Q, and the ratio (E/F) of the ratio of coverage E and the ratio of coverage F can also be set within any of the suitable ranges that were previously described in the same section.

In the step (a2), adhesive material is applied at an affixing surface of a separator web and a positive electrode.

Specifically, adhesive material is applied at an affixing surface of a separator web and a positive electrode in the step (a2) in a case in which an affixed body including a positive electrode is to be produced in the step (A) (for example, FIG. 10) and in a case in which an affixed body having adhesive material pre-applied at a position where a positive electrode is to be affixed after cutting (i.e., an affixed body not including a positive electrode) is to be produced in the step (A).

In other words, in FIG. 10, for example, adhesive material is applied from the coating machine 53 to an affixing surface of the first separator web 10A and the positive electrode 40.

Note that in the step (A), adhesive material may be supplied to one surface of the affixed body as illustrated in FIG. 10 (surface of second separator web 30A at opposite side thereof to negative electrode web 20A in FIG. 10), for example, in order to enable good adhesion of laminates to each other when laminates are stacked to produce a stack.

[Step (B)]

In the step (B), the affixed body is cut using a cutting machine 70. Note that in a case in which an affixed body that includes a positive electrode is cut in the step (B), the resultant cut bodies are each a laminate.

The cutting machine 70 can be any cutting machine that can be used in the field of secondary battery production, such as a cutting machine that cuts the affixed body by sandwiching the affixed body with cutting blades from both sides in a thickness direction of the affixed body.

In the step (B) implemented after the step (A), the affixed body can be cut well while also inhibiting curling of a separator from a negative electrode as previously described.

[Step (C)]

In the step (C) that is optionally implemented, a positive electrode is affixed to a cut body obtained through cutting of the affixed body in the step (B) to obtain a laminate in a case in which an affixed body that does not include a positive electrode has been cut in the step (B).

<Electrolyte Solution>

An organic electrolyte solution in which a supporting electrolyte is dissolved in an organic solvent is normally used as an electrolyte solution. A lithium salt can be used as the supporting electrolyte in a case in which the secondary battery is a lithium ion secondary battery, for example. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$.

Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The presently disclosed secondary battery can be produced by, for example, performing rolling, folding, or the like, in accordance with the battery shape, with respect to a stack obtained through stacking of laminates, as necessary, to place the stack in a device container (battery container), injecting the electrolyte solution into the device container, and sealing the device container. Note that the stack may be a laminate used in that form or may be produced through stacking of a plurality of laminates. Moreover, the stack may be produced by stacking a laminate and an additional battery member (for example, an electrode and/or a separator). In order to prevent internal pressure increase and occurrence of overcharging or overdischarging, an overcurrent preventing device such as a fuse or a PTC device, an expanded metal, a lead plate, or the like may be provided in the presently disclosed secondary battery as necessary. The shape of the secondary battery may be a coin type, button type, sheet type, cylinder type, prismatic type, flat type, or the like.

(Method of Producing Secondary Battery)

The presently disclosed method of producing a secondary battery is a method of producing a secondary battery including a laminate in which a positive electrode, a separator, and a negative electrode are stacked in stated order. A feature of the presently disclosed method of producing a secondary battery is that it includes a step (application step) of applying adhesive material with a specific condition at a surface Z that is either or both of an affixing surface X of the positive electrode and the separator and an affixing surface Y of the negative electrode and the separator.

Through the presently disclosed method of producing a secondary battery, it is possible to produce a secondary battery in which metal deposition at an electrode surface during charging is inhibited.

Moreover, through the presently disclosed production method, it is possible to efficiently produce the presently disclosed secondary battery set forth above.

Note that the presently disclosed method of producing a secondary battery may include other steps besides the application step described above.

<Application Step>

In the application step, adhesive material is applied at a surface Z such that, when either or both of an affixing surface X of the positive electrode and the separator and an affixing surface Y of the negative electrode and the separator are defined as the surface Z and the length of a connecting side of a positive electrode tab connected to the positive electrode or a negative electrode tab connected to the negative electrode is defined as L, a ratio of coverage E of adhesive material in a region P (electrode tab-bordering region P), at the surface Z, that has a rectangular shape having the connecting side and a line segment a distance 0.3L from the connecting side as one pair of opposite sides is larger than a ratio of coverage F of adhesive material in a region Q (other region Q) other than the region P at the surface Z.

Note that the method by which adhesive material is applied at the surface Z such that the ratio of coverage E of adhesive material in the electrode tab-bordering region P described above is larger than the ratio of coverage F of adhesive material in the other region Q may be a method of applying adhesive material that was previously described in the "Secondary battery" section, for example.

Moreover, ranges for values of the ratio of coverage E of adhesive material in the electrode tab-bordering region P, the ratio of coverage F of adhesive material in the other region Q, and the ratio (E/F) of the ratio of coverage E and the ratio of coverage F can also be set within any of the suitable ranges that were previously described in the "Secondary battery" section.

Furthermore, the positive electrode, separator, negative electrode, and adhesive material used in the application step may be those that were previously described in the "Secondary battery" section.

<Other Steps>

Examples of other steps include a stacking step, an electrode tab connection step, and an assembly step.

<<Stacking Step>>

In the stacking step, the positive electrode, the separator, and the negative electrode are stacked in stated order to obtain a laminate after adhesive material has been applied at the surface Z with the specific condition set forth above.

<<Electrode Tab Connection Step>>

In the electrode tab connection step, electrode tabs (positive electrode tab and negative electrode tab) are connected to the electrodes (positive electrode and negative electrode).

Note that the laminate can be obtained using the method of producing a laminate previously described in the "Secondary battery" section by implementing the application step, the stacking step, and the electrode tab connection step as some of the steps in that method of producing a laminate.

<<Assembly Step>>

The assembly step is a step in which a laminate and electrolyte solution are used to assemble a secondary battery and may, for example, be a step in which a secondary battery is assembled by further stacking additional battery members (for example, an electrode and/or a separator), as necessary, with a stack that has been obtained by stacking laminates, subsequently placing the resultant laminate in a battery container, injecting electrolyte solution into the battery container, and sealing the battery container.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the production examples, examples, and comparative examples, the following methods were used to measure and evaluate glass-transition temperature, volume-average particle diameter, degree of swelling, shape of adhesive material, coating weight in an application region, dry adhesive strength of an electrode and a separator, lithium deposition rate at a negative electrode surface, and output characteristics.

<Glass-Transition Temperature>

A water dispersion of a particulate polymer produced in each of Production Examples 1 to 6 was dried at a temperature of 130° C. for 1 hour to obtain a sample. After weighing 10 mg of the measurement sample into an aluminum pan, measurement thereof was performed in a differential scanning calorimeter (EXSTAR DSC6220 produced by SII NanoTechnology Inc.) under conditions prescribed in JIS Z8703, with a measurement temperature range of −100° C. to 500° C. and a heating rate of 10° C./min, so as to obtain a differential scanning calorimetry (DSC) curve. Note that an empty aluminum pan was used as a reference. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter>

The volume-average particle diameter of a particulate polymer produced in each production example was measured by laser diffraction. Specifically, a produced water dispersion of a particulate polymer (solid content concentration: 0.1 mass %) was used as a sample, and, in a particle size distribution (by volume) that was obtained using a laser diffraction particle diameter distribution analyzer (produced by Beckman Coulter, Inc.; product name: LS-13 320), the particle diameter at which cumulative volume calculated from a small diameter end of the distribution reached 50% was determined and was taken to be the volume-average particle diameter D50 (nm).

<Degree of Swelling>

A water dispersion of a particulate polymer produced in each production example was dried, and then approximately 0.2 g of the dried product that was obtained was pressed under pressing conditions of a temperature of 200° C. and a pressure of 5 MPa for 2 minutes to obtain a film. The obtained film was cut up to obtain a 1 cm square as a test specimen, and the mass W2 (g) of this test specimen was measured. Next, the test specimen was immersed in electrolyte solution (solution having $LiPF_6$ dissolved in a concentration of 1 mol/L in a mixed solvent of ethylene carbonate/diethyl carbonate in a volume ratio of 3/7) at a temperature of 60° C. for 72 hours. The test specimen was subsequently removed from this electrolyte solution, mixed solvent on the surface thereof was wiped off, and the mass W3 (g) of the test specimen was measured. The degree of swelling (%) was then calculated by the following formula.

Degree of swelling (%)=$W3/W2 \times 100$

<Shape of Adhesive Material>

The shape of adhesive material that had been applied at an affixing surface was observed using a laser microscope (VR-3100 produced by Keyence Corporation).

<Coating Weight of Adhesive Material>

The coating weight of adhesive material in each region was determined from the difference in mass per unit area between before supply of a composition for adhesion and after supply and drying of the composition for adhesion.

<Adhesive Strength of Electrode and Separator>

A laminate obtained after a separator and a negative electrode having adhesive material applied at one surface under the same conditions as in each example or comparative example had been pressed under pressing conditions of a temperature of 70° C. and a pressure of 1 MPa for 10 seconds and affixed to each other (i.e., a laminate in which one negative electrode and one separator were affixed via adhesive material) was sampled to obtain a test specimen.

The test specimen was placed with the surface at the current collector side of the negative electrode facing downward, and cellophane tape was affixed to the surface at the current collector side of the negative electrode. Tape prescribed by JIS Z1522 was used as the cellophane tape. Moreover, the cellophane tape was secured to a horizontal test stage in advance. The stress when the separator was peeled off by pulling one end of the separator vertically upward at a pulling speed of 50 mm/min was measured.

A total of 6 measurements were made in this manner, an average value of the stress was determined as the peel strength, and adhesiveness of the negative electrode and the separator was evaluated by the following standard. A larger peel strength indicates higher adhesiveness of the electrode (negative electrode) and the separator.

A: Peel strength of 1.5 N/m or more
B: Peel strength of not less than 1.0 N/m and less than 1.5 N/m
C: Peel strength of not less than 0.5 N/m and less than 1.0 N/m
D: Peel strength of less than 0.5 N/m <Lithium Deposition Rate at Negative Electrode Surface>

A produced lithium ion secondary battery was fully charged to a state of charge (SOC) of 100% with a 1 C constant current in an environment having a temperature of −10° C. The fully charged secondary battery was then disassembled, a negative electrode was removed therefrom, and the surface condition of a negative electrode mixed material layer of the negative electrode was inspected. The area of lithium that had deposited at the surface of the negative electrode mixed material layer was measured, and the lithium deposition rate at the negative electrode surface was calculated (=(area of deposited lithium/area of surface of negative electrode mixed material layer)×100(%)). An evaluation was made by the following standard. A lower lithium deposition rate at the negative electrode surface indicates that deposition of lithium at the negative electrode surface during charging is inhibited.

A: Lithium deposition rate of less than 10%
B: Lithium deposition rate of not less than 10% and less than 15%
C: Lithium deposition rate of not less than 15% and less than 20%
D: Lithium deposition rate of 20% or more <Output Characteristics>

A produced lithium ion secondary battery was constant-current constant-voltage (CCCV) charged to 4.3 V in an atmosphere having a temperature of 25° C. for cell preparation. The prepared cell was discharged to 3.0 V by 0.2 C and 1 C constant-current methods in an atmosphere having a temperature of −10° C., and the electric capacity for each thereof was determined. A discharge capacity maintenance rate expressed by the ratio of the electric capacities (=(electric capacity at 1 C/electric capacity at 0.2 C)×100(%)) was determined. These measurements were performed for 5 lithium ion secondary battery cells, and an average value for the determined discharge capacity maintenance rates was evaluated by the following standard as an output characteristic. A larger value indicates a better output characteristic.

A: Average value for discharge capacity maintenance rate of 80% or more
B: Average value for discharge capacity maintenance rate of not less than 70% and less than 80%
C: Average value for discharge capacity maintenance rate of not less than 60% and less than 70%
D: Average value for discharge capacity maintenance rate of less than 60%

Production Example 1

<Production of Particulate Polymer 1>

A reactor including a stirrer was supplied with 100 parts of deionized water and 0.3 parts of ammonium persulfate, the gas phase was purged with nitrogen gas, and the temperature was raised to 80° C. Meanwhile, a monomer composition for core portion formation was obtained in a separate vessel by mixing 40 parts of deionized water, 0.2 parts of sodium dodecylbenzenesulfonate as an emulsifier, 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer. The monomer composition for core portion formation was continuously added into the reactor over 3 hours so as to perform a polymerization reaction at a temperature of 80° C. Polymerization was continued until a polymerization conversion rate of 95% was reached to yield a water dispersion containing a particulate polymer forming a core portion. Next, a monomer composition for shell portion formation containing 29.7 parts of styrene as an aromatic monovinyl monomer and 0.3 parts of methacrylic acid as an acidic group-containing monomer was continuously supplied into the water dispersion over 60 minutes so as to continue polymerization. At the point at which the polymerization conversion rate reached 98%, the reaction was quenched by cooling to produce a water dispersion containing a particulate polymer 1.

The volume-average particle diameter, degree of swelling, and glass-transition temperature of the obtained particulate polymer 1 were measured. The results are shown in Table 1.

Upon observation of the cross-sectional structure of the particulate polymer using a transmission electron microscope (TEM), the particulate polymer was confirmed to have a core-shell structure in which a shell portion partially covered the outer surface of a core portion.

Production Example 2

<Production of Particulate Polymer 2>

A water dispersion of a particulate polymer 2 having a core-shell structure was produced in the same way as in Production Example 1 with the exception that, in production of the particulate polymer in Production Example 1, a monomer composition for core portion formation containing 17.0 parts of methyl methacrylate and 36.1 parts of butyl acrylate as monofunctional (meth)acrylic acid ester monomers, 14.0 parts of acrylonitrile as a (meth)acrylonitrile monomer, 2.8 parts of methacrylic acid as an acidic group-containing monomer, and 0.1 parts of ethylene glycol dimethacrylate as a cross-linkable monomer was used instead of the monomer composition for core portion formation containing 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer. Various measurements were performed in the same manner as in Production Example 1. The results are shown in Table 1.

<Production of Particulate Polymer 3>

A water dispersion of a particulate polymer 3 not having a core-shell structure was produced in the same way as in Production Example 1 with the exception that, in production of the particulate polymer in Production Example 1, a monomer composition containing 57.6 parts of styrene as an aromatic monovinyl monomer, 39.0 parts of 2-ethylhexyl acrylate as a monofunctional (meth)acrylic acid ester monomer, 3.0 parts of methacrylic acid as an acidic group-containing monomer, and 0.4 parts of ethylene glycol dimethacrylate as a cross-linkable monomer was used instead of the monomer composition for core portion formation containing 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer, and the monomer composition for shell portion formation was not supplied. Various measurements were performed in the same manner as in Production Example 1. The results are shown in Table 1.

Production Example 4

<Production of Particulate Polymer 4>

A reactor including a stirrer was supplied with 90 parts of deionized water and 0.5 parts of ammonium persulfate, the gas phase was purged with nitrogen gas, and the temperature was raised to 80° C. Meanwhile, a monomer composition was obtained in a separate vessel by mixing 15 parts of deionized water, 1.0 parts of NEOPELEX G15 (produced by Kao Corporation) as an emulsifier, 70.0 parts of 2-ethylhexyl acrylate as a monofunctional (meth)acrylic acid ester monomer, 25.0 parts of styrene as an aromatic monovinyl monomer, 1.7 parts of allyl glycidyl ether and 0.3 parts of allyl methacrylate as cross-linkable monomers, and 3.0 parts of acrylic acid as an acidic group-containing monomer.

The monomer composition was continuously added into the reactor over 4 hours to perform polymerization. The reaction was performed at 80° C. during this addition. Once the addition was complete, a further 3 hours of stirring was performed at a temperature of 80° C. to complete the reaction.

The resultant water dispersion was cooled to a temperature of 25° C. and was subsequently adjusted to pH 8.0 through addition of sodium hydroxide aqueous solution. Unreacted monomer was then removed through introduction of steam so as to yield a water dispersion of a particulate polymer 4 not having a core-shell structure. Various measurements were performed in the same manner as in Production Example 1. The results are shown in Table 1.

Production Example 5

A water dispersion of a particulate polymer 5 having a core-shell structure was produced in the same way as in Production Example 1 with the exception that, in production of the particulate polymer in Production Example 1, a monomer composition for core portion formation containing 20.2 parts of styrene as an aromatic monovinyl monomer, 47.6 parts of 2-ethylhexyl acrylate as a monofunctional (meth)acrylic acid ester monomer, 2.1 parts of methacrylic acid as an acidic group-containing monomer, and 0.1 parts of ethylene glycol dimethacrylate as a cross-linkable monomer was used instead of the monomer composition for core portion formation containing 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer. Various measurements were performed in the same manner as in Production Example 1. The results are shown in Table 1.

Production Example 6

A water dispersion of a particulate polymer 6 having a core-shell structure was produced in the same way as in Production Example 5 with the exception that, in production of the particulate polymer in Production Example 5, 0.03 parts of sodium dodecylbenzenesulfonate as an emulsifier was supplied into the reactor including a stirrer in addition to 100 parts of deionized water and 0.3 parts of ammonium persulfate. Various measurements were performed in the same manner as in Production Example 1. The results are shown in Table 1.

Example 1

<Production of Composition for Adhesion>

The water dispersion of the particulate polymer 1 obtained in Production Example 1 and the water dispersion of the particulate polymer 4 obtained in Production Example 4 were mixed such that the mass ratio thereof in terms of solid content was 100:10 and were then diluted to a solid content concentration of 10.5% through addition of deionized water. Propylene glycol was further added to the resultant mixture to adjust the solid content concentration to 10%, and thereby obtain a composition for adhesion 1.

<Production of Negative Electrode Web>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to a temperature of 50° C. to initiate polymerization. At the point at which the polymerization conversion rate reached 96%, the reaction was quenched by cooling to obtain a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to a temperature of 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then further mixed at a temperature of 25° C. for 60 minutes. The solid content concentration was further adjusted to 62% with deionized water and then a further 15 minutes of mixing was performed at a temperature of 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto both surfaces of copper foil (current collector) of 20 μm in thickness using a comma coater such as to have a thickness after drying of approximately 150 μm. The applied slurry composition was dried by conveying the copper foil inside an oven having a temperature of 60° C. for 2 minutes at a speed of 0.5 m/min. Thereafter, 2 minutes of heat treatment was performed at a temperature of 120° C. to obtain a pre-pressing negative electrode web. The pre-pressing negative electrode web was rolled by roll pressing to obtain a post-pressing negative electrode web having a negative electrode mixed material layer thickness of 80 μm.

<Production of Positive Electrode Web>

A slurry composition for a secondary battery positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto both surfaces of aluminum foil (current collector) of 20 μm in thickness using a comma coater such as to have a thickness after drying of approximately 150 μm. The applied slurry composition was dried by conveying the aluminum foil inside an oven having a temperature of 60° C. for 2 minutes at a speed of 0.5 m/min. Thereafter, 2 minutes of heat treatment was performed at a temperature of 120° C. to obtain a positive electrode web.

The obtained positive electrode web was rolled by a roll press to obtain a post-pressing positive electrode web including positive electrode mixed material layers.

<Preparation of Separator Web>

A separator web (product name: Celgard 2500) made of polypropylene (PP) was prepared.

<Production of Laminate>

Figure 12:
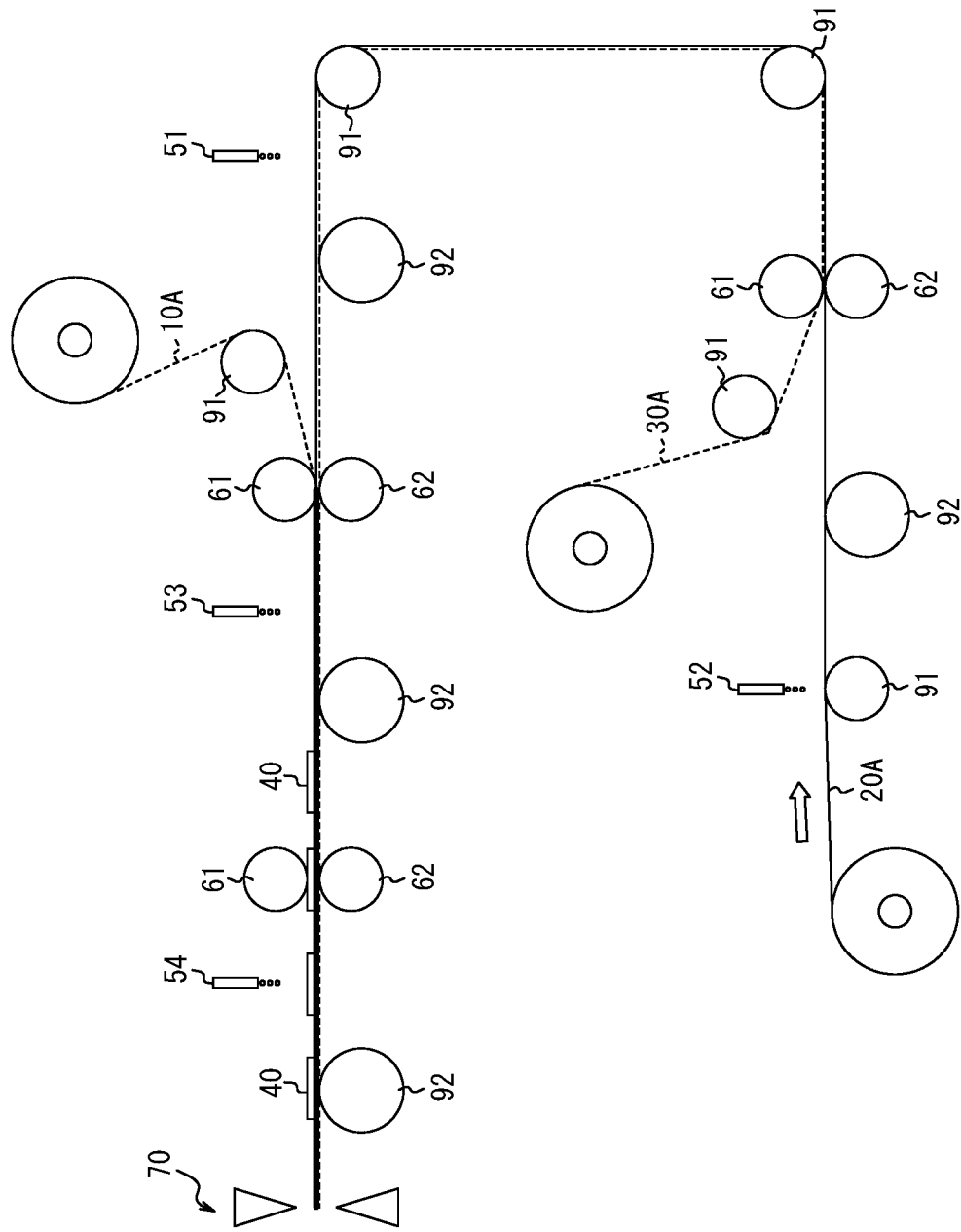
FIG. 12 is an explanatory diagram illustrating a production process of a laminate in examples and comparative examples.

The composition for adhesion, the negative electrode web, the positive electrode web, and the separator web that had been produced were used to produce a laminate as illustrated in FIG. 12. Note that reference sign 91 in FIG. 12 indicates a conveying roller, whereas reference sign 92 in FIG. 12 indicates a heat roller.

Specifically, a negative electrode web 20A fed from a negative electrode web roll was conveyed at a speed of 10 m/min while the composition for adhesion was supplied onto one surface of the negative electrode web 20A from an inkjet head of an inkjet-type coating machine 52 (KM1024 (shear-mode type) produced by Konica) and a second separator web 30A fed from a separator web roll was affixed to the negative electrode web 20A by pressure bonding rollers 61 and 62. The composition for adhesion was also supplied onto the other surface of the negative electrode web 20A from an inkjet head of an inkjet-type coating machine 51 (KM1024 (shear-mode type) produced by Konica), and a first separator web 10A fed from a separator web roll was affixed to the laminate of the negative electrode web 20A and the second separator web 30A by pressure bonding rollers 61 and 62. In addition, the composition for adhesion was supplied onto a surface of the first separator web 10A at the opposite side thereof to the negative electrode web 20A from an inkjet head of an inkjet-type coating machine 53 (KM1024 (shear-mode type) produced by Konica), positive electrodes 40 that had been cut in advance were placed thereon, and the positive electrodes 40 were affixed to the laminate of the first separator web 10A, the negative electrode web 20A, and the second separator web 30A by pressure bonding rollers 61 and 62. Furthermore, the composition for adhesion was supplied onto the positive electrodes 40 from an inkjet head of an inkjet-type coating machine 54 (KM1024 (shear-mode type) produced by Konica), and cutting was subsequently performed by a cutting machine 70 to obtain laminates in which a second separator, a negative electrode, a first separator, and a positive electrode were stacked in stated order. A section where an electrode mixed material layer (positive electrode mixed material layer or negative electrode mixed material layer) was not formed was provided at an end section of the current collector of each of the positive electrode 40 and the negative electrode web 20A, punching was performed such that a tab of a target size was formed in advance, and stacking was performed such that the positive electrode tab and the negative electrode tab were both disposed at a side corresponding to the same edge of an affixing surface X or Y (surface Z) of an electrode and a separator.

Note that affixing using the pressure bonding rollers 61 and 62 was performed at a temperature of 70° C. and a pressure of 1 MPa.

Moreover, the supplied composition for adhesion was dried (drying temperature: 70° C.; drying time: 1 s) by using heat rollers 92 as some of the conveying rollers 91.

Supply of the composition for adhesion from the coating machines 51-54 was performed as indicated in Table 2. Specifically, at each affixing surface X or Y (surface Z) of an electrode and a separator, (1) a rectangular region N1 completely encompassing a region P1 (positive electrode tab-bordering region P1) that had a rectangular shape having a connecting side (length defined as $L_1$) of a positive electrode tab 44 and a line segment a distance $0.3L_1$ from the connecting side of the positive electrode tab 44 as one pair of opposite sides and (2) a rectangular region N2 completely encompassing a region P2 (negative electrode tab-bordering region P2) that had a rectangular shape having a connecting side (length defined as $L_2$) of a negative electrode tab 28 and a line segment a distance $0.3L_2$ from the connecting side of the negative electrode tab 28 as one pair of opposite sides were both taken to be a "region S where adhesive material is applied densely" in Table 2 and a region other than the "region S where adhesive material is applied densely" was taken to be a "region T where adhesive material is applied sparsely" in Table 2, and the composition for an adhesive layer was applied (supplied) such that the "ratio of coverage of adhesive material" was 3.0% and the "coating weight of adhesive material" was 0.180 g/m² in the "region S where adhesive material is applied densely" and such that the "ratio of coverage of adhesive material" was 0.79% and the "coating weight of adhesive material" was 0.044 g/m² in the "region T where adhesive material is applied sparsely". Note that "adhesive material" in "ratio of coverage of adhesive material" and "coating weight of adhesive material" each refer to material in a state in which solvent has been removed from the composition for adhesion by drying. Also note that (1) the positive electrode tab-bordering region P1 had an area equivalent to 3.2% of the area of the affixing surface X or Y (surface Z) and (2) the negative electrode tab-bordering region P2 had an area equivalent to 3.2% of the area of the affixing surface X or Y (surface Z). Moreover, (1) the rectangular region N1 completely encompassing the positive electrode tab-bordering region P1 had an area equivalent to 5% of the area of the affixing surface X or Y (surface Z) and (2) the rectangular region N2 completely encompassing the negative electrode tab-bordering region P2 had an area equivalent to 5% of the area of the affixing surface X or Y (surface Z). Accordingly, the above-described "region S where adhesive material is applied densely" (i.e., the total area of (1) the rectangular region N1 and (2) the rectangular region N2) had an area equivalent to 10% of the area of the affixing surface X or Y (surface Z). The previously described composition for adhesion 1 was used as the applied composition for adhesion in both the "region S where adhesive material is applied densely" and the "region T where adhesive material is applied sparsely". Moreover, the composition for adhesion was applied such as to be arranged in a dotted pattern in both the "region S where adhesive material is applied densely" and the "region T where adhesive material is applied sparsely". Upon observation of the dried composition for adhesion (adhesive material that is a dried product) using a laser microscope, adhesive material was arranged in plurality in a fine dotted pattern at an affixing surface. For both the "region S where adhesive material is applied densely" and the "region T where adhesive material is applied sparsely", the dot size of adhesive material arranged in a dotted pattern was 40 μm in diameter.

As previously described, the negative electrode tab-bordering region P2 was composed of only a section corresponding to the "region S where adhesive material is applied densely". Therefore, the ratio of coverage E of adhesive material was 3.0% and the coating weight of adhesive material was 0.180 g/m² in the negative electrode tab-bordering region P2. On the other hand, both a section corresponding to the "region S where adhesive material is applied densely" and a section corresponding to the "region T where adhesive material is applied sparsely" were present in the region Q2 (other region Q2) other than the negative electrode tab-bordering region P2. The ratio of coverage F of adhesive material was 0.95% and the coating weight of adhesive material was 0.054 g/m² in the other region Q2.

Note that in a case in which both a section corresponding to the "region S where adhesive material is applied densely" and a section corresponding to the "region T where adhesive material is applied sparsely" are present in a given region U, the ratio of coverage and coating weight of adhesive material in the region U can be determined by the following formulae.

Ratio of coverage of adhesive material in region U=(Ratio of coverage of adhesive material in region S where adhesive material is applied densely)×(Proportion occupied by region S where adhesive material is applied densely among entire region U)+(Ratio of coverage of adhesive material in region T where adhesive material is applied sparsely)×(Proportion occupied by region T where adhesive material is applied sparsely among entire region U)

Coating weight of adhesive material in region U=(Coating weight of adhesive material in region S where adhesive material is applied densely)×(Proportion occupied by region S where adhesive material is applied densely among entire region U)+(Coating weight of adhesive material in region T where adhesive material is applied sparsely)×(Proportion occupied by region T where adhesive material is applied sparsely among entire region U)

Dry adhesive strength of the laminate was evaluated. The result is shown in Table 2.

<Production of Secondary Battery and Measurement of Resistance>

The produced laminate was enclosed in an aluminum packing case serving as a case, and electrolyte solution (solvent: ethylene carbonate/diethyl carbonate/vinylene carbonate=68.5/30/1.5 (volume ratio); electrolyte: LiPF$_6$ of 1 M in concentration) was injected. An opening of the aluminum packing case was subsequently closed by heat sealing at a temperature of 150° C. to produce a lithium ion secondary battery. The lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

The lithium ion secondary battery was subsequently charged to an SOC (State of Charge) of 50% and was then disassembled in an inert gas atmosphere. Three electrode groups were randomly punched out from the above-described negative electrode tab-bordering region P2 of the disassembled laminate such as to have an effective area of 1 cm². Each of these electrode groups was enclosed in an aluminum packing case serving as a case once tab leads had been joined thereto, and then the previously described electrolyte solution was injected. In this manner, 3 secondary batteries that were each composed of only the negative electrode tab-bordering region P2 were produced. The produced batteries were each discharged under conditions of a discharge rate of 3 C and a discharge time of 10 s, and an average value for direct current resistance values during this discharging was taken to be the resistance A2 of the negative electrode tab-bordering region P2. Note that the "direct current resistance" referred to herein indicates a resistance value that is calculated by the following formula when the voltage before discharge (0 s) is taken to be V0 and the voltage after 10 s is taken to be V1.

Direct current resistance=1 cm²×(V1−V0)/3 C current value

In the same manner, 10 electrode groups were randomly punched out from the region Q2 other than the negative electrode tab-bordering region P2 of the disassembled laminate such as to have an effective area of 1 cm×1 cm, and secondary batteries composed of only the other region Q2 were produced by the same method. The produced batteries were discharged under the same conditions as described above, and an average value of direct current resistance values during this discharging was taken to be the resistance B2 per unit area of the other region Q. A ratio (A2/B2) of the resistance values is shown in Table 2.

In addition, 5 laminates that were produced as previously described were stacked and were pressed at a temperature of 70° C. and a pressure of 1 MPa for 10 seconds to produce a stack. The produced stack was enclosed in an aluminum packing case serving as a case, and electrolyte solution (solvent: ethylene carbonate/diethyl carbonate/vinylene carbonate=68.5/30/1.5 (volume ratio); electrolyte: LiPF$_6$ of 1 M in concentration) was injected. An opening of the aluminum packing case was subsequently closed by heat sealing at a temperature of 150° C. to produce a stacked lithium ion secondary battery having a capacity of 800 mAh. The lithium deposition rate at a negative electrode surface and output characteristics were evaluated for the obtained secondary battery. The results are shown in Table 2.

Example 2

A composition for adhesion, a negative electrode web, a positive electrode web, a separator web, a laminate, and a secondary battery were produced and prepared in the same way as in Example 1 with the exception that, in production of the laminate in Example 1, the composition for adhesion was supplied from the coating machines 51-54 as described below.

Specifically, a region between an edge at a side where both the positive electrode tab and the negative electrode tab were disposed at an affixing surface X or Y (surface Z) of an electrode and a separator and a straight line parallel to the edge was taken to be a "region S where adhesive material is applied densely" in Table 2 and a region of the affixing surface X or Y (surface Z) other than the "region S where adhesive material is applied densely" was taken to be a "region T where adhesive material is applied sparsely" in Table 2, and the composition for an adhesive layer was applied (supplied) such that the "ratio of coverage of adhesive material" was 3.0% and the "coating weight of adhesive material" was 0.180 g/m² in the "region S where adhesive material is applied densely" and such that the "ratio of coverage of adhesive material" was 0.79% and the "coating weight of adhesive material" was 0.044 g/m² in the "region T where adhesive material is applied sparsely". Note that application was performed such that the "region S where adhesive material is applied densely" had an area equivalent to 20% of the area of the affixing surface X or Y (surface Z).

As a result of application being performed as described above, the negative electrode tab-bordering region P2 was composed of only a section corresponding to the "region S where adhesive material is applied densely". Therefore, the ratio of coverage E of adhesive material was 3.0% and the coating weight of adhesive material was 0.180 g/m² in the negative electrode tab-bordering region P2. On the other hand, a section corresponding to the "region S where adhesive material is applied densely" and a section corresponding to the "region T where adhesive material is applied sparsely" were both present in the region Q2 (other region Q2) other than the negative electrode tab-bordering region P2. The ratio of coverage F of adhesive material was 1.17% and the coating weight of adhesive material was 0.068 g/m² in the other region Q2.

Various measurements and evaluations were performed in the same way as in Example 1. The results are shown in Table 2.

Example 3

In production of the laminate in Example 1, the distance (pitch) between centers of the composition for adhesion supplied in a dotted form in the "region S where adhesive material is applied densely" and the "region T where adhesive material is applied sparsely" was adjusted so as to change only the dot size of the composition for adhesion supplied in a dotted form from 40 µm in diameter to 80 µm in diameter without changing the ratio of coverage of adhesive material in each of the "region S where adhesive material is applied densely" and the "region T where adhesive material is applied sparsely". As a result, the coating weight of adhesive material in the "region S where adhesive material is applied densely" was 0.124 g/m² and the coating weight of adhesive material in the "region T where adhesive material is applied sparsely" was 0.031 g/m². Thereafter, a composition for adhesion, a negative electrode web, a positive electrode web, a separator web, a laminate, and a secondary battery were produced and prepared in the same way as in Example 1.

Various measurements and evaluations were performed in the same way as in Example 1. The results are shown in Table 2.

Example 4

In production of the laminate in Example 1, the distance (pitch) between centers of the composition for adhesion supplied in a dotted form in the "region S where adhesive material is applied densely" and the "region T where adhesive material is applied sparsely" was adjusted so as to change only the dot size of the composition for adhesion supplied in a dotted form from 40 µm in diameter to 20 µm in diameter without changing the ratio of coverage of adhesive material in each of the "region S where adhesive material is applied densely" and the "region T where adhesive material is applied sparsely". As a result, the coating weight of adhesive material in the "region S where adhesive material is applied densely" was 0.158 g/m² and the coating weight of adhesive material in the "region T where adhesive material is applied sparsely" was 0.040 g/m². Thereafter, a composition for adhesion, a negative electrode web, a positive electrode web, a separator web, a laminate, and a secondary battery were produced and prepared in the same way as in Example 1.

Various measurements and evaluations were performed in the same way as in Example 1. The results are shown in Table 2.

Example 5

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region T where adhesive material is applied sparsely" was adjusted so as to change the ratio of coverage of adhesive material from 0.79% to 0.35% and change the coating weight of adhesive material from 0.044 g/m² to 0.022 g/m² in the "region T where adhesive material is applied sparsely".

Various measurements and evaluations were performed in the same way as in Example 1. The results are shown in Table 2.

Example 6

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region T where adhesive material is applied sparsely" was adjusted so as to change the ratio of coverage of adhesive material from 0.79% to 0.20% and change the coating weight of adhesive material from 0.044 g/m² to 0.011 g/m² in the "region T where adhesive material is applied sparsely".

Various measurements and evaluations were performed in the same way as in Example 1. The results are shown in Table 2.

Example 7

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region T where adhesive material is applied sparsely" was adjusted so as to change the ratio of coverage of adhesive material from 0.79% to 1.40% and change the coating weight of adhesive material from 0.044 g/m² to 0.079 g/m² in the "region T where adhesive material is applied sparsely".

Various measurements and evaluations were performed in the same way as in Example 1. The results are shown in Table 2.

Example 8

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region S where adhesive material is applied densely" was adjusted so as to change the ratio of coverage of adhesive material from 3.00% to 5.60% and change the coating weight of adhesive material from 0.180 g/m² to 0.316 g/m² in the "region S where adhesive material is applied densely".

Various measurements and evaluations were performed in the same way as in Example 1. The results are shown in Table 2.

Example 9

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region S where adhesive material is applied densely" was adjusted so as to change the ratio of coverage of adhesive material from 3.00% to 12.57% and change the coating weight of adhesive material from 0.180 g/m² to 0.712 g/m² in the "region S where adhesive material is applied densely".

Various measurements and evaluations were performed in the same way as in Example 1. The results are shown in Table 2.

Example 10

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region S where adhesive material is applied densely" was adjusted so as to change the ratio of coverage of adhesive material from 3.00% to 1.40% and change the coating weight of adhesive material from 0.180 g/m² to 0.079 g/m² in the "region S where adhesive material is applied densely".

Various measurements and evaluations were performed in the same way as in Example 1. The results are shown in Table 2.

Example 11

A composition for adhesion, a negative electrode web, a positive electrode web, a separator web, a laminate, and a secondary battery were produced and prepared in the same way as in Example 1 with the exception that, in production of the laminate in Example 1, the supply form of the composition for adhesion in the "region S where adhesive material is applied densely" and the "region T where adhesive material is applied sparsely" was changed from a dotted form to a striped form, the ratio of coverage of adhesive material was changed from 3.00% to 9.09% and the coating weight of adhesive material was changed from 0.180 g/m² to 0.400 g/m² in the "region S where adhesive material is applied densely", and the ratio of coverage of adhesive material was changed from 0.79% to 3.61% and the coating weight of adhesive material was changed from 0.044 g/m² to 0.100 g/m² in the "region T where adhesive material is applied sparsely".

Various measurements and evaluations were performed in the same way as in Example 1. The results are shown in Table 2.

Example 12

A composition for adhesion, a negative electrode web, a positive electrode web, a separator web, a laminate, and a secondary battery were produced and prepared in the same way as in Example 1 with the exception that, in production of the laminate in Example 1, the composition for adhesion applied in the "region S where adhesive material is applied densely" and the "region T where adhesive material is applied sparsely" was changed from the composition for adhesion 1 that was produced in Example 1 to a composition for adhesion 4 that was produced as described below.

Various measurements and evaluations were performed in the same way as in Example 1. The results are shown in Table 2.

<Production of Composition for Adhesion 4>

After adding 5 parts of sodium dodecylbenzenesulfonate to 100 parts of deionized water and stirring these materials using a disper blade, 10 parts of a powder of vinylidene fluoride-hexafluoropropylene copolymer (PVdF-HFP; LBG produced by Arkema) was gradually added and was stirred therewith for 2 hours to yield a water dispersion having a solid content concentration of PVdF-HFP of 10.5%. Propylene glycol was further added to the obtained water dispersion to adjust the solid content concentration to 10%, and thereby yield a composition for adhesion 4.

Example 13

A composition for adhesion, a negative electrode web, a positive electrode web, a separator web, a laminate, and a secondary battery were produced and prepared in the same way as in Example 1 with the exception that, in production of the laminate in Example 1, the area of the "region S where adhesive material is applied densely" was changed from 10% to 50% of the area of the affixing surface X or Y, and the area of the "region T where adhesive material is applied sparsely" was changed from 90% to 50% of the area of the affixing surface X or Y.

As a result of application being performed as described above, the negative electrode tab-bordering region P2 was composed of only a section corresponding to the "region S where adhesive material is applied densely". Therefore, the ratio of coverage E of adhesive material was 3.0% and the coating weight of adhesive material was 0.180 g/m² in the negative electrode tab-bordering region P2. On the other hand, a section corresponding to the "region S where adhesive material is applied densely" and a section corresponding to the "region T where adhesive material is applied sparsely" were both present in the region Q2 (other region Q2) other than the negative electrode tab-bordering region P2. The ratio of coverage F of adhesive material was 1.86% and the coating weight of adhesive material was 0.110 g/m² in the other region Q2.

Various measurements and evaluations were performed in the same way as in Example 1. The results are shown in Table 2.

Example 14

A composition for adhesion, a negative electrode web, a positive electrode web, a separator web, a laminate, and a secondary battery were produced and prepared in the same way as in Example 1 with the exception that, in production of the laminate in Example 1, an "application region S1" was set instead of the "region S where adhesive material is applied densely" and a composition for adhesion 2 produced as described below was applied in the "application region S1" such that the ratio of coverage of adhesive material was 3.00% and the coating weight of adhesive material was 0.180 g/m², and a region other than the "region S where adhesive material is applied densely" at the affixing surface X or Y was set as an "application region S2" instead of the "region T where adhesive material is applied sparsely" and the composition for adhesion 1 was applied in the "application region S2" such that the ratio of coverage of adhesive material was 3.00% and the coating weight of adhesive material was 0.180 g/m².

Various measurements and evaluations were performed in the same way as in Example 1. The results are shown in Table 3.

<Production of Composition for Adhesive Layer 2>

A composition for adhesion 2 was obtained in the same way as in Example 1 with the exception that, in production of the composition for an adhesive layer in Example 1, the water dispersion of the particulate polymer 2 having a core-shell structure that was obtained in Production Example 2 was used instead of the water dispersion of the particulate polymer 1 having a core-shell structure that was obtained in Production Example 1.

Example 15

A composition for adhesion, a negative electrode web, a positive electrode web, a separator web, a laminate, and a secondary battery were produced and prepared in the same way as in Example 1 with the exception that, in production of the laminate in Example 1, an "application region S1" was set instead of the "region S where adhesive material is applied densely" and a composition for adhesion 3 produced as described below was applied in the "application region S1" such that the ratio of coverage of adhesive material was 3.00% and the coating weight of adhesive material was 0.180 g/m², and a region other than the "region S where adhesive material is applied densely" at the affixing surface X or Y was set as an "application region S2" instead of the "region T where adhesive material is applied sparsely" and the composition for adhesion 1 was applied in the "application region S2" such that the ratio of coverage of adhesive material was 3.00% and the coating weight of adhesive material was 0.180 g/m².

Various measurements and evaluations were performed in the same way as in Example 1. The results are shown in Table 3.

<Production of Composition for Adhesive Layer 3>

A composition for adhesion 3 was obtained in the same way as in Example 1 with the exception that, in production of the composition for an adhesive layer in Example 1, the water dispersion of the particulate polymer 3 not having a core-shell structure that was obtained in Production Example 3 was used instead of the water dispersion of the particulate polymer 1 having a core-shell structure that was obtained in Production Example 1.

Example 16

A composition for adhesion, a negative electrode web, a positive electrode web, a separator web, a laminate, and a secondary battery were produced and prepared in the same way as in Example 1 with the exception that, in production of the laminate in Example 1, the composition for adhesion that was applied in the "region S where adhesive material is applied densely" and the "region T where adhesive material is applied sparsely" was changed from the composition for adhesion 1 that was produced in Example 1 to a composition for adhesion 5 that was produced as described below.

Various measurements and evaluations were performed in the same way as in Example 1. The results are shown in Table 4.

<Production of Composition for Adhesive Layer 5>

A composition for adhesion 5 was obtained in the same way as in Example 1 with the exception that, in production of the composition for an adhesive layer in Example 1, the water dispersion of the particulate polymer 5 having a core-shell structure that was obtained in Production Example 5 was used instead of the water dispersion of the particulate polymer 1 having a core-shell structure that was obtained in Production Example 1.

Example 17

A composition for adhesion, a negative electrode web, a positive electrode web, a separator web, a laminate, and a secondary battery were produced and prepared in the same way as in Example 1 with the exception that, in production of the laminate in Example 1, the composition for adhesion that was applied in the "region S where adhesive material is applied densely" and the "region T where adhesive material is applied sparsely" was changed from the composition for adhesion 1 that was produced in Example 1 to a composition for adhesion 6 that was produced as described below.

Various measurements and evaluations were performed in the same way as in Example 1. The results are shown in Table 4.

<Production of Composition for Adhesive Layer 6>

A composition for adhesion 6 was obtained in the same way as in Example 1 with the exception that, in production of the composition for an adhesive layer in Example 1, the water dispersion of the particulate polymer 6 having a core-shell structure that was obtained in Production Example 6 was used instead of the water dispersion of the particulate polymer 1 having a core-shell structure that was obtained in Production Example 1.

Comparative Example 1

An adhesive material, a composition for adhesion, a negative electrode web, a positive electrode web, a separator web, a laminate, and a secondary battery were produced and prepared in the same way as in Example 1 with the exception that gravure coaters were used instead of inkjet-type coating machines as the coating machines 51-54, and the composition for adhesion 1 was applied over the entirety of an affixing surface such that the ratio of coverage of adhesive material was 90% and the coating weight of adhesive material was 0.220 g/m² for the entire affixing surface.

Various evaluations were performed in the same way as in Example 1. The results are shown in Table 2.

Comparative Example 2

A composition for adhesion, a negative electrode web, a positive electrode web, a separator web, a laminate, and a secondary battery were produced and prepared in the same way as in Example 2 with the exception that, in production of the laminate in Example 2, the area of the "region S where adhesive material is applied densely" was changed from 10% to 100% of the area of the affixing surface X or Y, and the area of the "region T where adhesive material is applied sparsely" was changed from 90% to 0% of the area of the affixing surface X or Y.

Various measurements and evaluations were performed in the same way as in Example 1. The results are shown in Table 2.

Comparative Example 3

A composition for adhesion, a negative electrode web, a positive electrode web, a separator web, a laminate, and a secondary battery were produced and prepared in the same way as in Example 2 with the exception that, in production of the laminate in Example 2, the area of the "region S where adhesive material is applied densely" was changed from 10% to 0% of the area of the affixing surface X or Y, and the area of the "region T where adhesive material is applied sparsely" was changed from 90% to 100% of the area of the affixing surface X or Y.

Various measurements and evaluations were performed in the same way as in Example 1. The results are shown in Table 2.

In Tables 1 to 3:
"MMA" indicates methyl methacrylate;
"BA" indicates butyl acrylate;
"2EHA" indicates 2-ethylhexyl acrylate;
"AN" indicates acrylonitrile;
"St" indicates styrene;
"MAA" indicates methacrylic acid;
"AA" indicates acrylic acid;
"AGE" indicates allyl glycidyl ether;
"AMA" indicates allyl methacrylate; and
"EDMA" indicates ethylene glycol dimethacrylate.

Moreover, in Table 2:
"PVdF-HFP" indicates vinylidene fluoride-hexafluoropropylene copolymer.

TABLE 1

| Type of particulate polymer | | | Production Example 1 Particulate polymer 1 | Production Example 2 Particulate polymer 2 | Production Example 3 Particulate polymer 3 | Production Example 4 Particulate polymer 4 | Production Example 5 Particulate polymer 5 | Production Example 6 Particulate polymer 6 |
|---|---|---|---|---|---|---|---|---|
| Chemical composition [mass %] | Core portion | MMA | — | 17 | — | — | — | — |
| | | BA | — | 36.1 | — | — | — | — |
| | | 2EHA | 27.3 | — | 39 | 70 | 47.6 | 47.6 |
| | | AN | — | 14 | — | — | — | — |
| | | St | 40.3 | — | 57.6 | 25 | 20.2 | 20.2 |
| | | MAA | 2.1 | 2.8 | 3 | — | 2.1 | 2.1 |
| | | AA | — | — | — | 3 | — | — |
| | | AGE | — | — | — | 1.7 | — | — |
| | | AMA | — | — | — | 0.3 | — | — |
| | | EDMA | 0.3 | 0.1 | 0.4 | — | 0.1 | 0.1 |
| | Shell portion | St | 29.7 | 29.7 | | | 29.7 | 29.7 |
| | | MAA | 0.3 | 0.3 | | | 0.3 | 0.3 |
| Mass ratio (core portion/shell portion) | | | 7/3 | 7/3 | — | — | 7/3 | 7/3 |
| Glass-transition temperature [° C.] | Core portion | | 35 | 35 | 35 | −25 | −18 | −18 |
| | Shell portion | | 105 | 105 | | | 105 | 105 |
| Volume-average particle diameter D50 [nm] | | | 700 | 680 | 650 | 200 | 700 | 300 |
| Degree of swelling [%] | | | 170 | 1200 | 170 | 170 | 170 | 170 |

| | | | Example 1 | Example 2 | Example 3 | Example 4 | Example 5 | Example 6 | Example 7 | Example 8 |
|---|---|---|---|---|---|---|---|---|---|---|
| Application conditions | Application method | | Inkjet | Inkjet | Inkjet | Inkjet | Inkjet | Inkjet | Inkjet | Inkjet |
| | Application pattern | | Dot | Dot | Dot | Dot | Dot | Dot | Dot | Dot |
| | Region S where adhesive material is applied densely | Composition Type | Composition for adhesion 1 | Composition for adhesion 1 | Composition for adhesion 1 | Composition for adhesion 1 | Composition for adhesion 1 | Composition for adhesion 1 | Composition for adhesion 1 | Composition for adhesion 1 |
| | | Chemical composition | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 |

-continued

| | | | | | | | | | | |
|---|---|---|---|---|---|---|---|---|---|---|
| | | Proportion of area occupied at surface Z [%] | 10 | 20 | 10 | 10 | 10 | 10 | 10 | 10 |
| | | Coating weight of adhesive material [g/m²] | 0.180 | 0.180 | 0.124 | 0.158 | 0.180 | 0.180 | 0.180 | 0.316 |
| | | Dot size (diameter) or stripe width [μm] | 40 | 40 | 80 | 20 | 40 | 40 | 40 | 40 |
| | | Ratio of coverage of adhesive material [%] | 3.00 | 3.00 | 3.00 | 3.00 | 3.00 | 3.00 | 3.00 | 5.60 |
| | Region T where adhesive material is applied sparsely | Composition for adhesion Type | Composition for adhesion 1 | Composition for adhesion 1 | Composition for adhesion 1 | Composition for adhesion 1 | Composition for adhesion 1 | Composition for adhesion 1 | Composition for adhesion 1 | Composition for adhesion 1 |
| | | Chemical composition | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 |
| | | Proportion of area occupied at surface Z [%] | 90 | 80 | 90 | 90 | 90 | 90 | 90 | 90 |
| | | Coating weight of adhesive material [g/m²] | 0.044 | 0.044 | 0.031 | 0.040 | 0.022 | 0.011 | 0.079 | 0.044 |
| | | Dot size (diameter) or stripe width [μm] | 40 | 40 | 80 | 20 | 40 | 40 | 40 | 40 |
| | | Ratio of coverage of adhesive material [%] | 0.79 | 0.79 | 0.79 | 0.79 | 0.35 | 0.20 | 1.40 | 0.79 |
| Negative electrode tab-bordering region P2 | Ratio of coverage E of adhesive material [%] | | 3.00 | 3.00 | 3.00 | 3.00 | 3.00 | 3.00 | 3.00 | 5.60 |
| | Coating weight of adhesive material [g/m²] | | 0.180 | 0.180 | 0.124 | 0.158 | 0.180 | 0.180 | 0.180 | 0.316 |
| Other region Q2 | Ratio of coverage F of adhesive material [%] | | 0.95 | 1.17 | 0.95 | 0.95 | 0.54 | 0.40 | 1.51 | 1.13 |
| | Coating weight of adhesive material [g/m²] | | 0.054 | 0.068 | 0.038 | 0.048 | 0.033 | 0.023 | 0.086 | 0.063 |
| Ratio (E/F) of ratios of coverage of adhesive material | | | 3.17 | 2.56 | 3.17 | 3.17 | 5.60 | 7.56 | 1.98 | 4.97 |
| Ratio (A2/B2) of resistance A2 per unit area of negative electrode tab-bordering region P2 and resistance B2 per unit area of other region Q2 | | | 1.02 | 1.015 | 1.02 | 1.02 | 1.15 | 1.24 | 1.007 | 1.20 |
| Evaluation | Adhesive strength | | A | A | A | A | B | C | A | A |
| | Lithium deposition rate at negative electrode surface | | A | A | A | A | A | A | B | A |
| | Output characteristics | | A | A | A | A | A | A | B | A |

| | | | Example 9 | Example 10 | Example 11 | Example 12 | Example 13 | Comparative Example 1 | Comparative Example 2 | Comparative Example 3 |
|---|---|---|---|---|---|---|---|---|---|---|
| Application conditions | Application method | | Inkjet | Inkjet | Inkjet | Inkjet | Inkjet | Gravure coater | Inkjet | Inkjet |
| | Application pattern | | Dot | Dot | Stripe | Dot | Dot | Entire surface | Dot | Dot |
| | Region S where adhesive material is applied densely | Composition for adhesion Type | Composition for adhesion 1 | Composition for adhesion 1 | Composition for adhesion 1 | Composition for adhesion 4 | Composition for adhesion 1 | Composition for adhesion 1 | Composition for adhesion 1 | — |
| | | Chemical composition | Particulate polymer 1 + particulate polymer 4 | Particulate polymer 1 + particulate polymer 4 | Particulate polymer 1 + particulate polymer 4 | PVdF-HFP | Particulate polymer 1 + particulate polymer 4 | Particulate polymer 1 + particulate polymer 4 | Particulate polymer 1 + particulate polymer 4 | |
| | | Proportion of area occupied at surface Z [%] | 10 | 10 | 10 | 10 | 50 | 100 | 100 | |
| | | Coating weight of adhesive material [g/m²] | 0.712 | 0.079 | 0.400 | 0.180 | 0.180 | 0.220 | 0.180 | |

-continued

| | | | | | | | | | | |
|---|---|---|---|---|---|---|---|---|---|---|
| | | Dot size (diameter) or stripe width [μm] | | 40 | 40 | 30 | 40 | 40 | — | 40 | |
| | | Ratio of coverage of adhesive material [%] | | 12.57 | 1.40 | 9.09 | 3.00 | 3.00 | 90.00 | 3.00 | |
| | Region T where adhesive material is applied sparsely | Composition for adhesion | Type | Composition for adhesion 1 | Composition for adhesion 1 | Composition for adhesion 1 | Composition for adhesion 4 | Composition for adhesion 1 | — | — | Composition for adhesion 1 |
| | | | Chemical composition | Particulate polymer 1 + particulate polymer 4 | Particulate polymer 1 + particulate polymer 4 | Particulate polymer 1 + particulate polymer 4 | PVdF-HFP | Particulate polymer 1 + particulate polymer 4 | | | Particulate polymer 1 + particulate polymer 4 |
| | | Proportion of area occupied at surface Z [%] | | 90 | 90 | 90 | 90 | 50 | | | 100 |
| | | Coating weight of adhesive material [g/m$^2$] | | 0.044 | 0.044 | 0.100 | 0.044 | 0.044 | | | 0.044 |
| | | Dot size (diameter) or stripe width [μm] | | 40 | 40 | 30 | 40 | 40 | | | 40 |
| | | Ratio of coverage of adhesive material [%] | | 0.79 | 0.79 | 3.61 | 0.79 | 0.79 | | | 0.79 |
| Negative electrode tab-bordering region P2 | Ratio of coverage E of adhesive material [%] | | | 12.57 | 1.40 | 9.09 | 3.00 | 3.00 | 90.00 | 3.00 | 0.79 |
| | Coating weight of adhesive material [g/m$^2$] | | | 0.712 | 0.079 | 0.400 | 0.180 | 0.180 | 0.220 | 0.180 | 0.044 |
| Other region Q2 | Ratio of coverage F of adhesive material [%] | | | 1.62 | 0.83 | 3.99 | 0.95 | 1.86 | 90.00 | 3.00 | 0.79 |
| | Coating weight of adhesive material [g/m$^2$] | | | 0.091 | 0.046 | 0.121 | 0.054 | 0.110 | 0.220 | 0.180 | 0.044 |
| Ratio (E/F) of ratios of coverage of adhesive material | | | | 7.77 | 1.68 | 2.28 | 3.17 | 1.61 | 1.00 | 1.00 | 1.00 |
| Ratio (A2/B2) of resistance A2 per unit area of negative electrode tab-bordering region P2 and resistance B2 per unit area of other region Q2 | | | | 1.50 | 1.003 | 1.080 | 1.02 | 1.003 | 1.000 | 1.000 | 1.000 |
| Evaluation | Adhesive strength | | | A | A | A | A | A | A | A | A |
| | Lithium deposition rate at negative electrode surface | | | A | C | B | A | C | D | D | D |
| | Output characteristics | | | B | A | B | A | C | D | C | A |

TABLE 3

| | | | | Example 14 | Example 15 |
|---|---|---|---|---|---|
| Application conditions | | Application method | | Inkjet | Inkjet |
| | | Application pattern | | Dot | Dot |
| | Application region S1 | Composition for adhesion | Type | Composition for adhesion 2 | Composition for adhesion 3 |
| | | | Chemical composition | Particulate polymer 2 + particulate polymer 4 | Particulate polymer 3 + particulate polymer 4 |
| | | Proportion of area occupied at surface Z [%] | | 10 | 10 |
| | | Coating weight of adhesive material [g/m$^2$] | | 0.180 | 0.180 |
| | | Dot size (diameter) or stripe width [μm] | | 40 | 40 |
| | | Ratio of coverage of adhesive material [%] | | 3.00 | 3.00 |
| | Application region S2 | Composition for adhesion | Type | Composition for adhesion 1 | Composition for adhesion 1 |
| | | | Chemical composition | Particulate polymer 1 + particulate polymer 4 | Particulate polymer 1 + particulate polymer 4 |

TABLE 3-continued

|  |  | Example 14 | Example 15 |
|---|---|---|---|
|  | Proportion of area occupied at surface Z [%] | 90 | 90 |
|  | Coating weight of adhesive material [g/m$^2$] | 0.180 | 0.180 |
|  | Dot size (diameter) or stripe width [μm] | 40 | 40 |
|  | Ratio of coverage of adhesive material [%] | 3.00 | 3.00 |
| Negative electrode tab-bordering region P2 Other region Q2 | Ratio of coverage E of adhesive material [%] | 3.00 | 3.00 |
|  | Coating weight of adhesive material [g/m$^2$] | 0.180 | 0.180 |
|  | Ratio of coverage F of adhesive material [%] | 3.00 | 3.00 |
|  | Coating weight of adhesive material [g/m$^2$] | 0.180 | 0.180 |
| Ratio (E/F) of ratios of coverage of adhesive material |  | 1.00 | 1.00 |
| Ratio (A2/B2) of resistance A2 per unit area of negative electrode tab-bordering region P2 and resistance B2 per unit area of other region Q2 |  | 1.070 | 1.070 |
| Evaluation | Adhesive strength | A | A |
|  | Lithium deposition rate at negative electrode surface | A | A |
|  | Output characteristics | A | B |

TABLE 4

|  |  |  |  | Example 16 | Example 17 |
|---|---|---|---|---|---|
| Application conditions |  | Application method |  | Inkjet | Inkjet |
|  |  | Application pattern |  | Dot | Dot |
|  | Region S where adhesive material is applied densely | Composition for adhesion | Type | Composition for adhesion 5 | Composition for adhesion 6 |
|  |  |  | Chemical composition | Particulate polymer 5 + particulate polymer 4 | Particulate polymer 6 + particulate polymer 4 |
|  |  | Proportion of area occupied at surface Z [%] |  | 10 | 10 |
|  |  | Coating weight of adhesive material [g/m$^2$] |  | 0.180 | 0.180 |
|  |  | Dot size (diameter) or stripe width [μm] |  | 40 | 40 |
|  |  | Ratio of coverage of adhesive material [%] |  | 3.00 | 3.00 |
|  | Region T where adhesive material is applied sparsely | Composition for adhesion | Type | Composition for adhesion 5 | Composition for adhesion 6 |
|  |  |  | Chemical composition | Particulate polymer 5 + particulate polymer 4 | Particulate polymer 6 + particulate polymer 4 |
|  |  | Proportion of area occupied at surface Z [%] |  | 90 | 90 |
|  |  | Coating weight of adhesive material [g/m$^2$] |  | 0.04 | 0.04 |
|  |  | Dot size (diameter) or stripe width [μm] |  | 40 | 40 |
|  |  | Ratio of coverage of adhesive material [%] |  | 0.79 | 0.79 |
| Negative electrode tab-bordering region P2 Other region Q2 | Ratio of coverage E of adhesive material [%] |  |  | 3.00 | 3.00 |
|  | Coating weight of adhesive material [g/m$^2$] |  |  | 0.180 | 0.180 |
|  | Ratio of coverage F of adhesive material [%] |  |  | 0.79 | 0.79 |
|  | Coating weight of adhesive material [g/m$^2$] |  |  | 0.044 | 0.044 |
| Ratio (E/F) of ratios of coverage of adhesive material |  |  |  | 3.80 | 3.80 |
| Ratio (A2/B2) of resistance A2 per unit area of negative electrode tab-bordering region P2 and resistance B2 per unit area of other region Q2 |  |  |  | 1.020 | 1.020 |
| Evaluation | Adhesive strength |  |  | A | A |
|  | Lithium deposition rate at negative electrode surface |  |  | A | A |
|  | Output characteristics |  |  | A | A |

It can be seen from Tables 2, 3, and 4 that lithium deposition at a negative electrode surface during charging is inhibited in the secondary batteries of Examples 1 to 17 that each include a laminate in which a positive electrode, a separator, and a negative electrode are stacked in stated order and in each of which the resistance A2 per unit area of a region P2 that has a rectangular shape having a connecting side of a negative electrode tab and a line segment a specific distance from the connecting side as one pair of opposite sides is larger than the resistance B2 per unit area of a region Q2 other than the region P2 at a surface Z that is either or both of an affixing surface X of the positive electrode and the separator and an affixing surface Y of the negative electrode and the separator.

On the other hand, it can be seen that inhibition of lithium deposition at a negative electrode surface during charging of a secondary battery is poor in Comparative Examples 1 to 3 in which the resistance A2 per unit area of the above-described region P2 is not larger than the resistance B2 per unit area of the region Q2 other than the region P2.

INDUSTRIAL APPLICABILITY

According to the present disclosure, it is possible to provide a secondary battery in which metal deposition at an electrode surface during charging is inhibited.

REFERENCE SIGNS LIST 10 first separator
10A first separator web
20 negative electrode
20A negative electrode web
21 negative electrode current collector
22, 23 negative electrode mixed material layer
24 first edge
25 second edge 26 third edge
27 fourth edge
28 negative electrode tab
30 second separator
30A second separator web
40 positive electrode
41 positive electrode current collector
42, 43 positive electrode mixed material layer
44 positive electrode tab
50 droplet
51-54 coating machine (nozzle head)
55 nozzle
60 substrate
61, 62 pressure bonding roller
70 cutting machine
91 conveying roller
92 heat roller
Z surface
P1 positive electrode tab-bordering region
P2 negative electrode tab-bordering region
$L_1$, $L_2$ length of connecting side
S region where adhesive material is applied densely
T region where adhesive material is applied sparsely
r dot radius
x, y distance between centers of dots
l line width of application sections
s spacing of application sections (line width of non-application sections)
100, 100A laminate
200 stack
300 particulate polymer
310 core portion
310S outer surface of core portion
320 shell portion

The invention claimed is:

1. A secondary battery comprising a laminate in which a positive electrode, a separator, and a negative electrode are stacked in stated order, wherein,
when either or both of an affixing surface X of the positive electrode and the separator and an affixing surface Y of the negative electrode and the separator are defined as a surface Z, and
length of a connecting side of a positive electrode tab connected to the positive electrode or a negative electrode tab connected to the negative electrode is defined as L,
direct current resistance A per unit area of a region P, at the surface Z, that has a rectangular shape having the connecting side of length L as one side and a line segment parallel to the connecting side at a distance 0.3L from the connecting side as an opposite side is larger than direct current resistance B per unit area of a region Q other than the region P at the surface Z, and
a ratio (A/B) of the direct current resistance A and the direct current resistance B is 1.003 or more.

2. The secondary battery according to claim 1, wherein an adhesive material is present at the surface Z, and
a ratio of coverage E of the adhesive material in the region P of the surface Z is larger than a ratio of coverage F of the adhesive material in the region Q of the surface Z.

3. The secondary battery according to claim 2, wherein the ratio of coverage E is not less than 1.3% and not more than 30%.

4. The secondary battery according to claim 2, wherein the ratio of coverage F is not less than 0.5% and less than 0.4×E %.

5. The secondary battery according to claim 1, wherein an adhesive material is present at the surface Z,
the adhesive material contains a particulate polymer, and
the particulate polymer has a core-shell structure including a core portion and a shell portion partially covering an outer surface of the core portion.

6. A method of producing the secondary battery according to claim 1, comprising a step of applying an adhesive material at a surface Z that is either or both of an affixing surface X of the positive electrode and the separator and an affixing surface Y of the negative electrode and the separator, wherein,
when length of a connecting side of a positive electrode tab connected to the positive electrode or a negative electrode tab connected to the negative electrode is defined as L,
a ratio of coverage E of the adhesive material in a region P, at the surface Z, that has a rectangular shape having the connecting side and a line segment a distance 0.3L from the connecting side as one pair of opposite sides is larger than a ratio of coverage F of the adhesive material in a region Q other than the region P at the surface Z.

7. The method of producing the secondary battery according to claim 6, wherein the ratio of coverage E is not less than 1.3% and not more than 30%.

8. The method of producing the secondary battery according to claim 6, wherein the ratio of coverage F is not less than 0.5% and less than 0.4×E %.

9. The method of producing the secondary battery according to claim 6, wherein
the adhesive material contains a particulate polymer, and
the particulate polymer has a core-shell structure including a core portion and a shell portion partially covering an outer surface of the core portion.

* * * * *